No. 630,403. Patented Aug. 8, 1899.
G. PATUREAU.
BOX MACHINE.
(Application filed Sept. 3, 1896.)

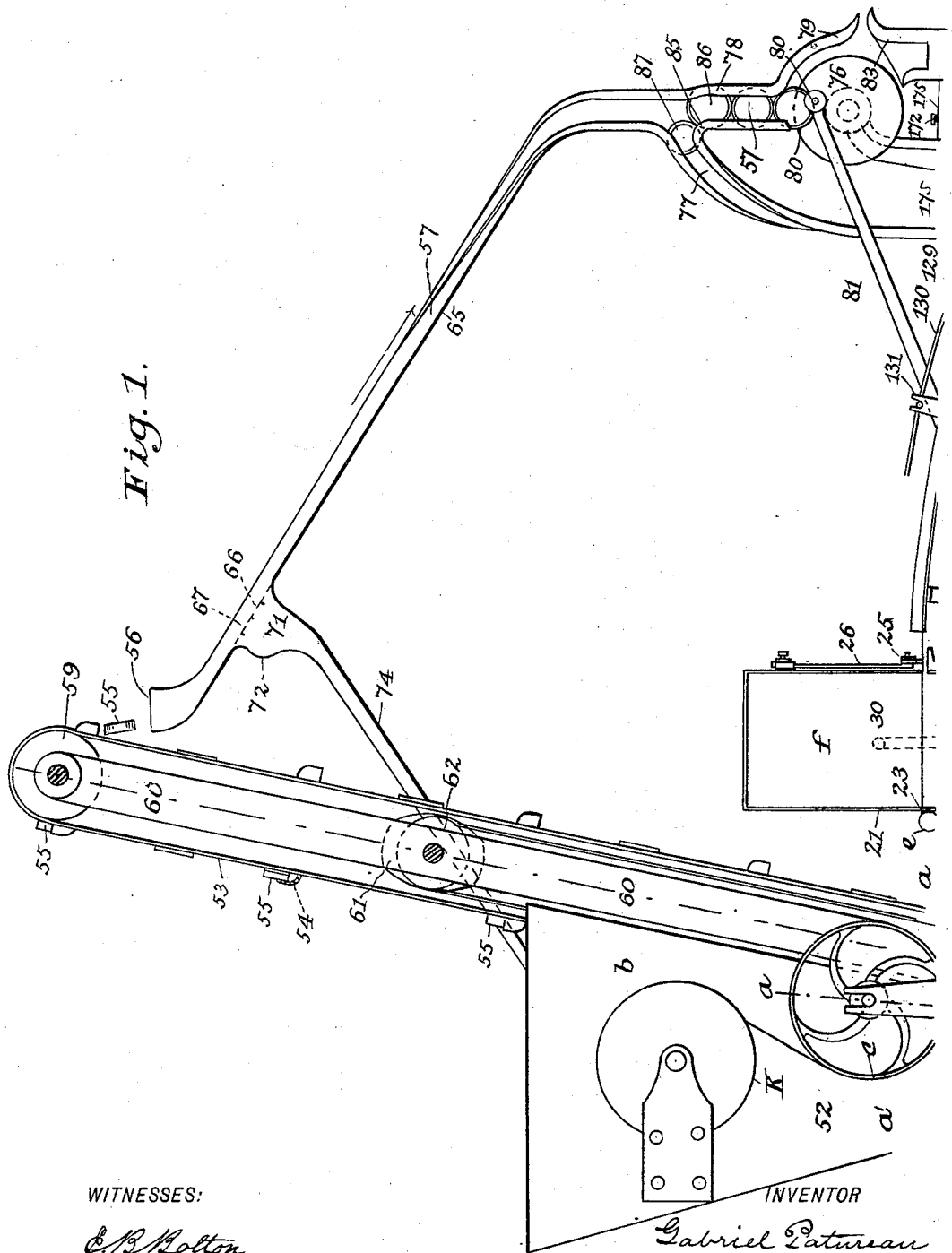

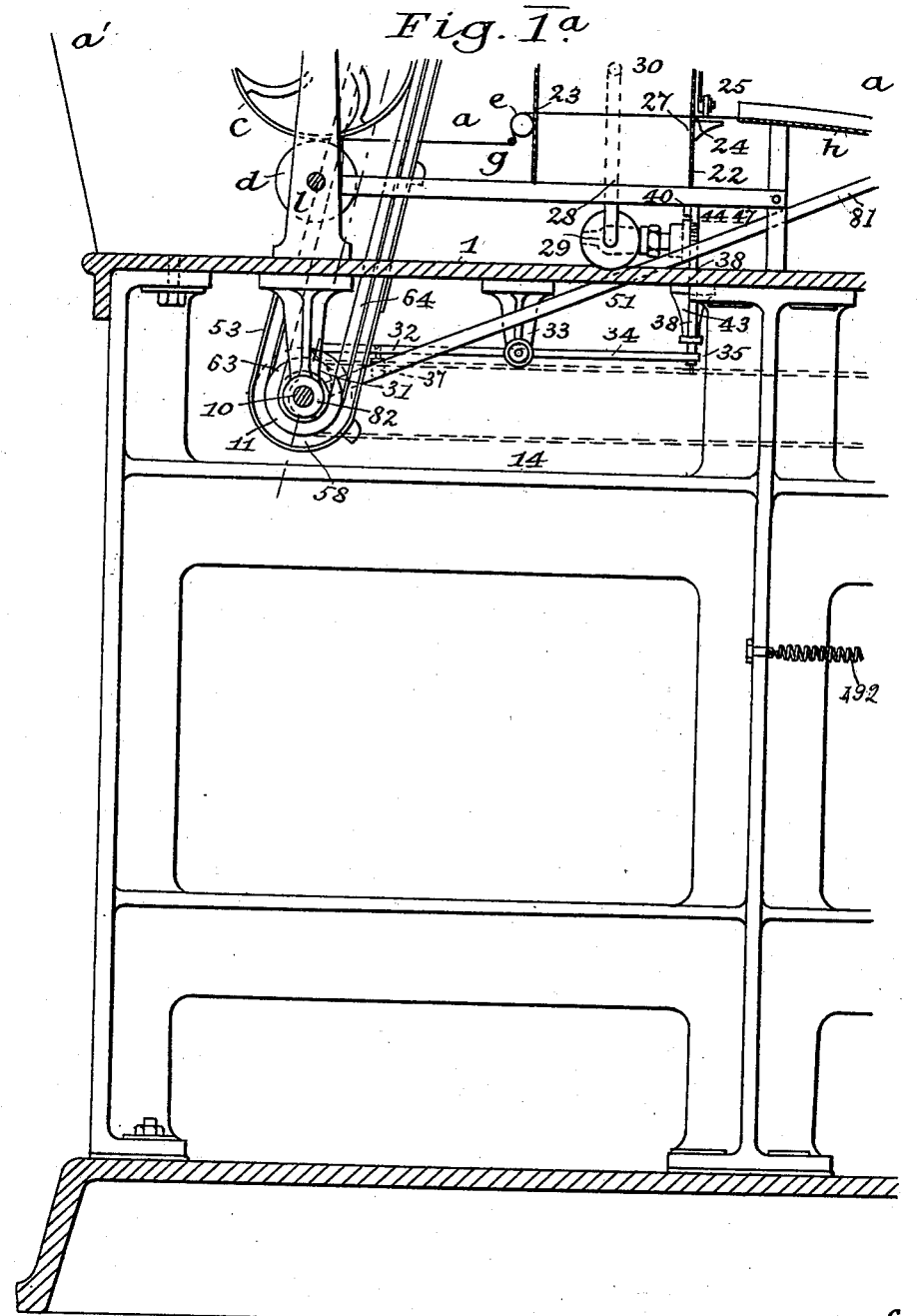

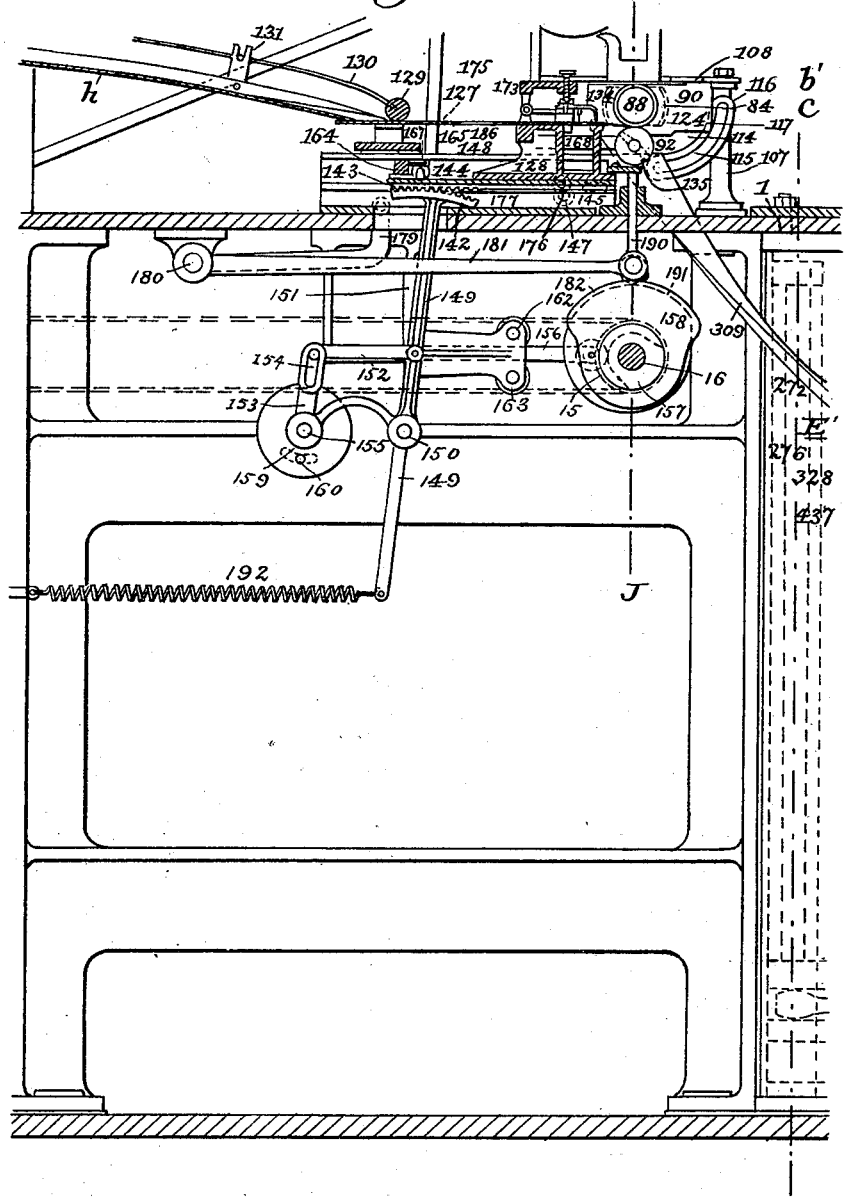

(No Model.) 35 Sheets—Sheet 4.

WITNESSES:

INVENTOR
Gabriel Patureau
BY
ATTORNEYS

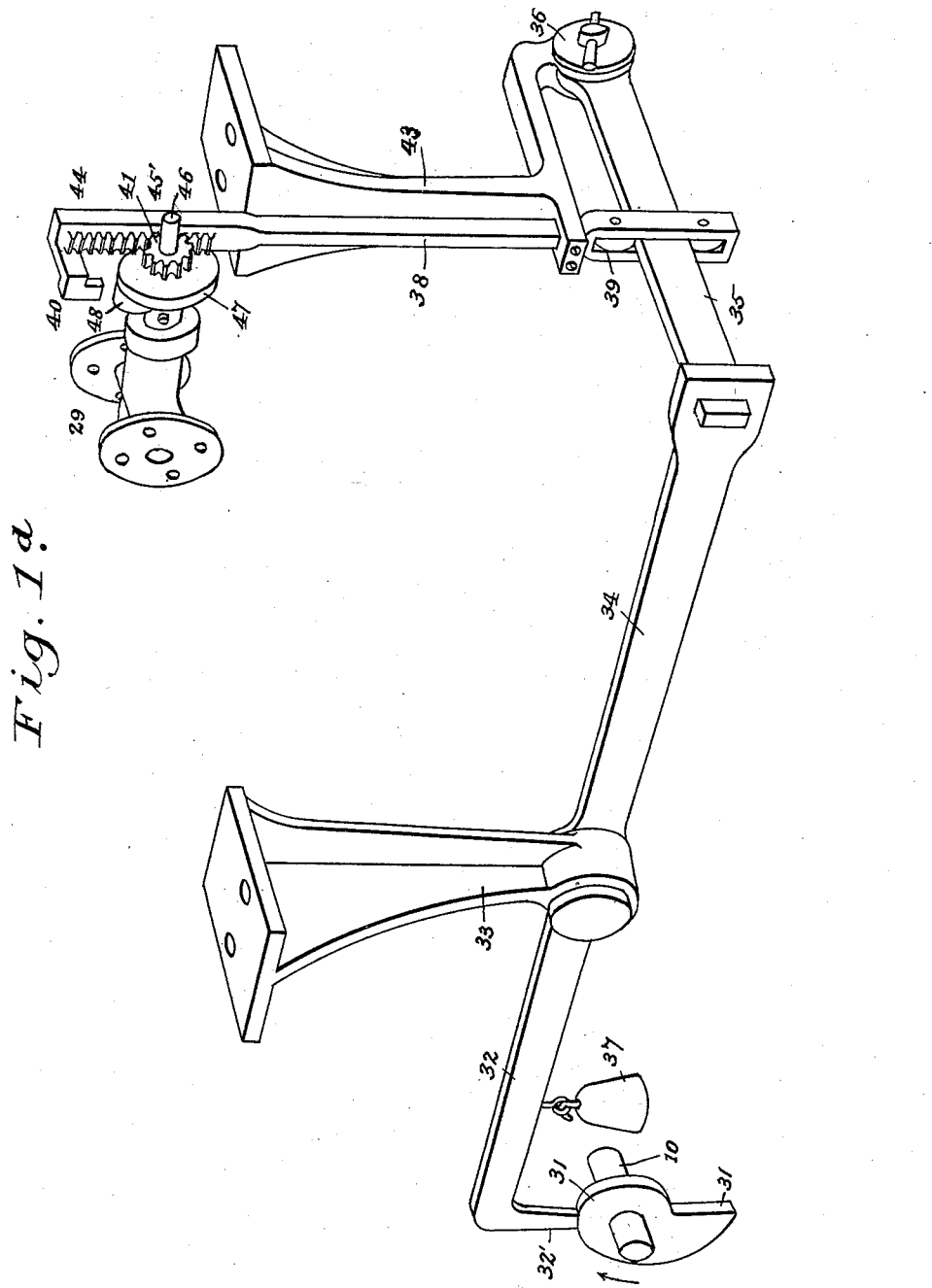

Figure 1C:
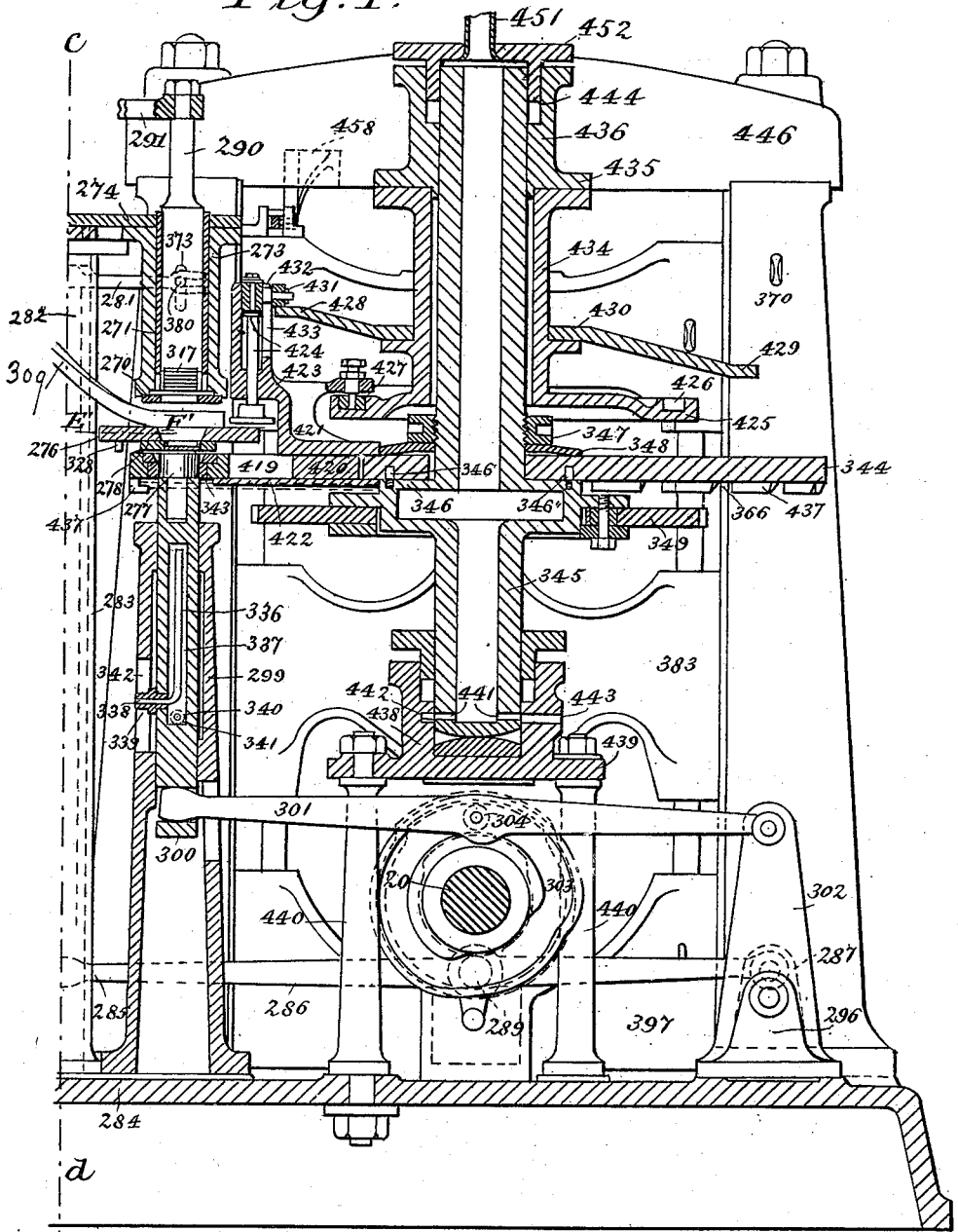

No. 630,403. Patented Aug. 8, 1899.
G. PATUREAU.
BOX MACHINE.
(Application filed Sept. 3, 1896.)
(No Model.) 35 Sheets—Sheet 6.
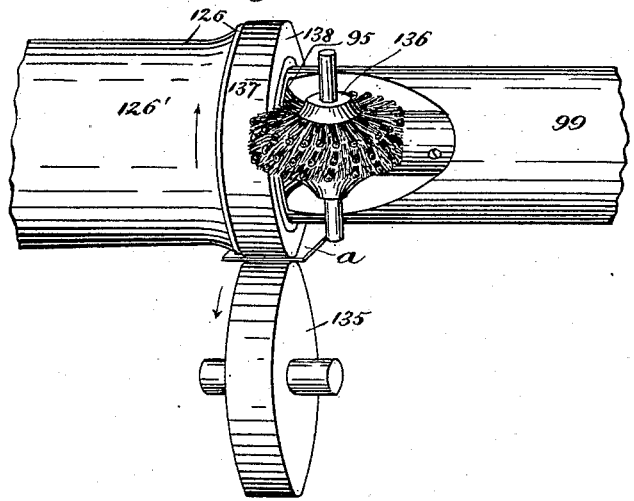
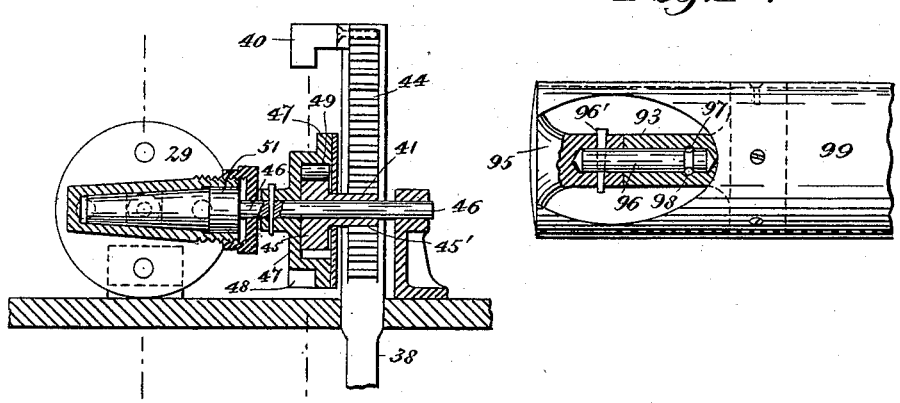
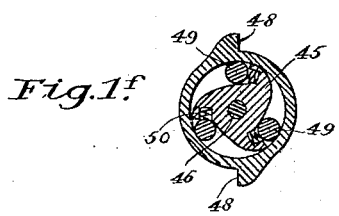
WITNESSES:
INVENTOR
Gabriel Patureau
BY
ATTORNEYS No. 630,403. Patented Aug. 8, 1899.
G. PATUREAU.
BOX MACHINE.
(Application filed Sept. 3, 1896.)
(No Model.) 35 Sheets—Sheet 7.
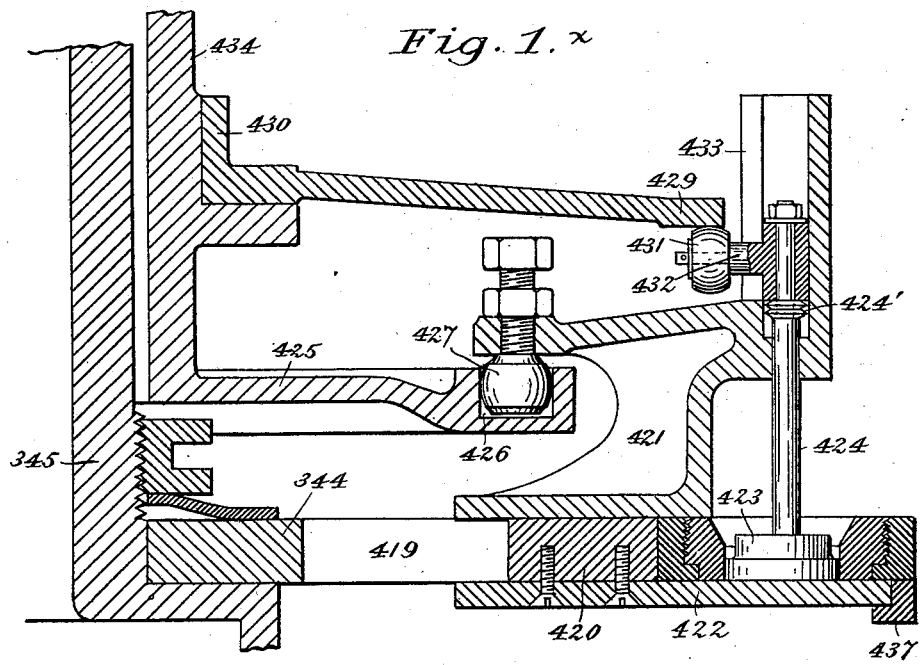
Fig. 1.ˣ
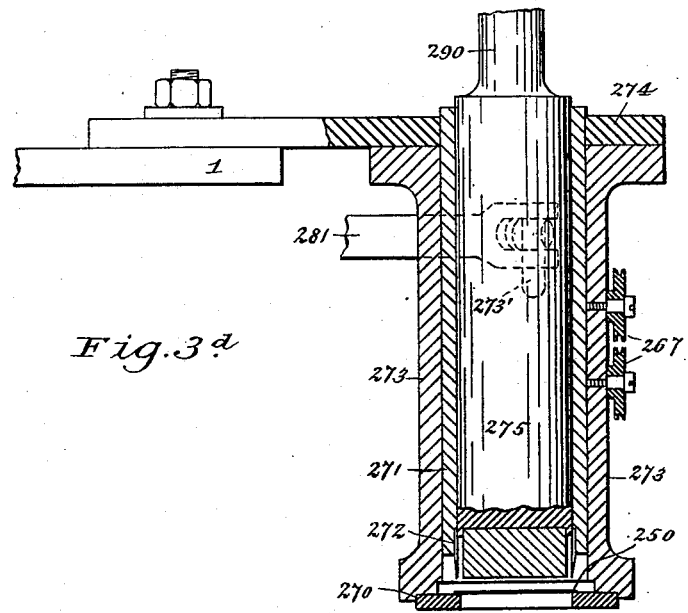
Fig. 3.ᵈ
WITNESSES.
INVENTOR
Gabriel Patureau
BY
ATTORNEYS No. 630,403.  
G. PATUREAU.  
BOX MACHINE.  
(Application filed Sept. 3, 1896.)  
Patented Aug. 8, 1899.
(No Model.)
35 Sheets—Sheet 8.
Fig. 1'.
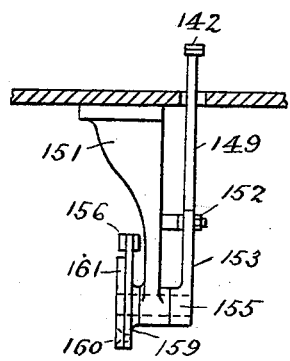
Fig. 1".
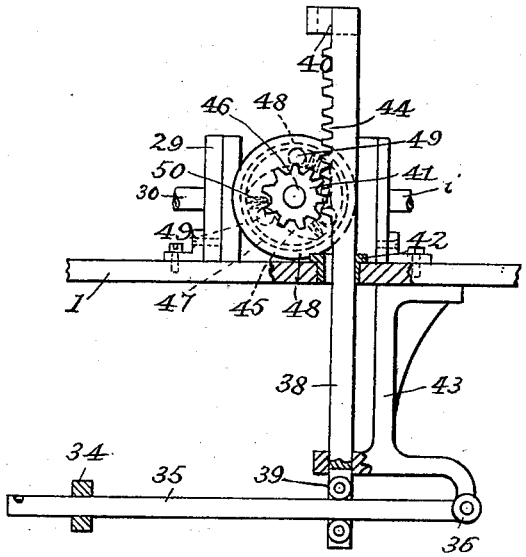
WITNESSES:  
E. B. Bolton
INVENTOR  
Gabriel Patureau  
BY  
ATTORNEYS

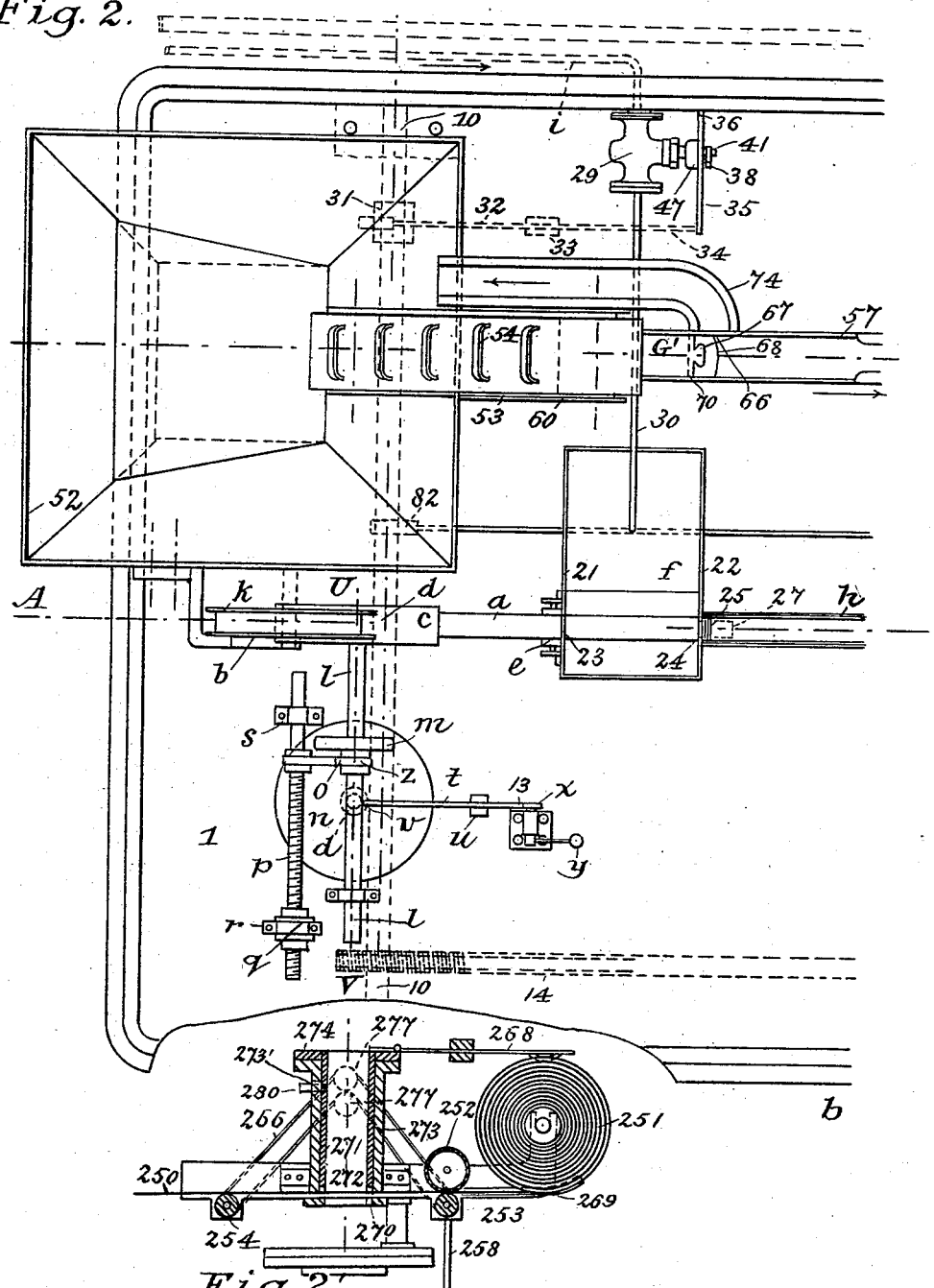

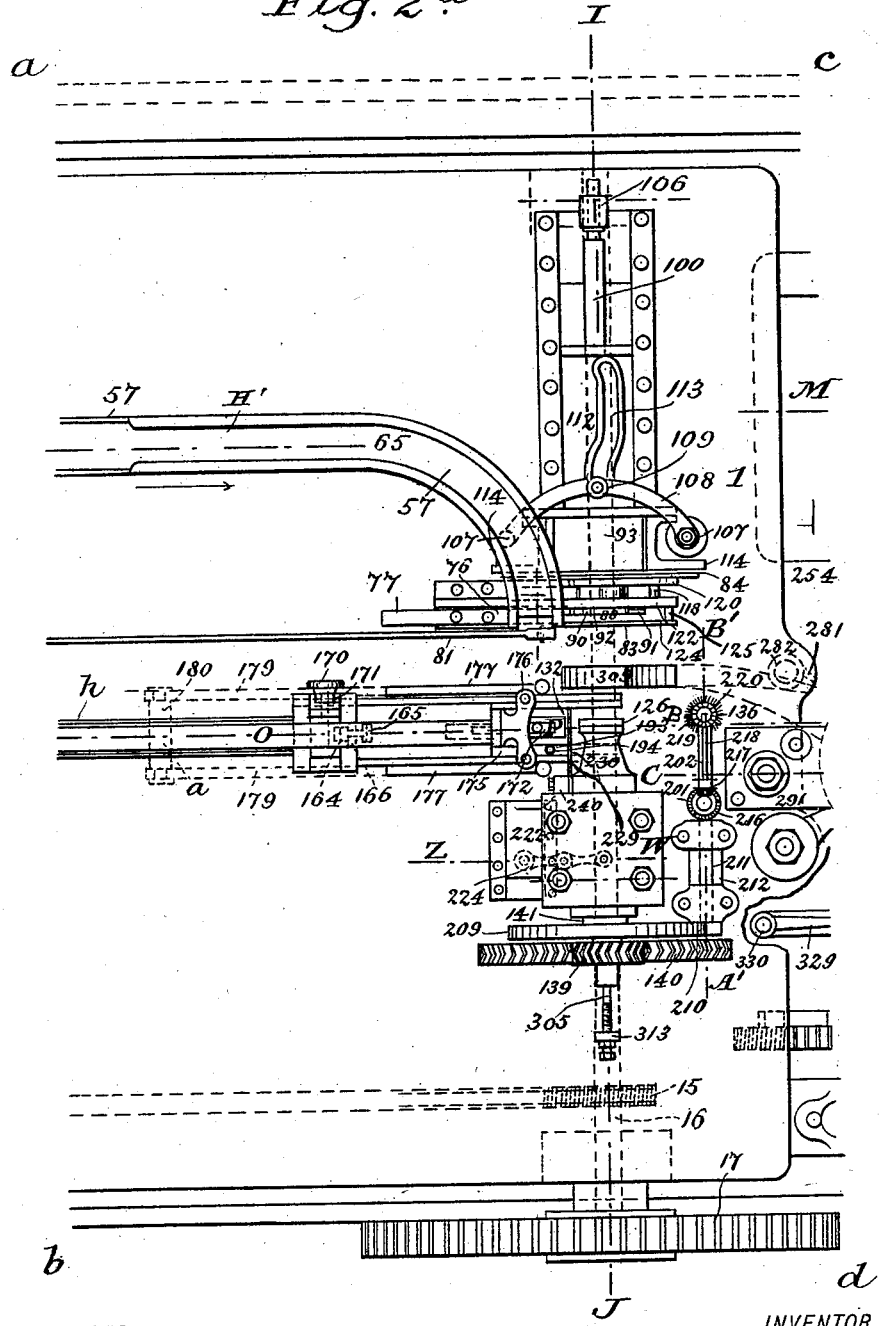

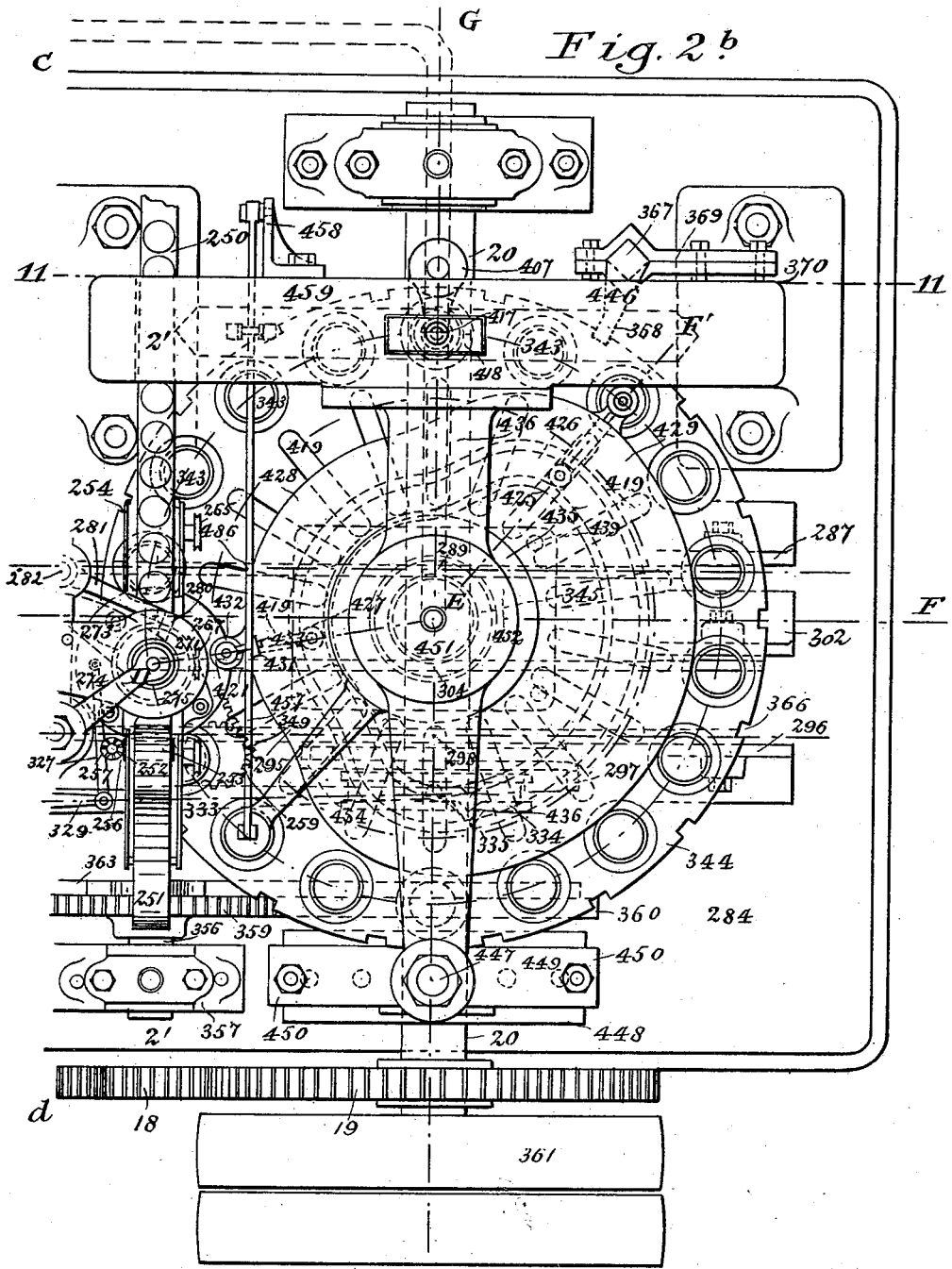

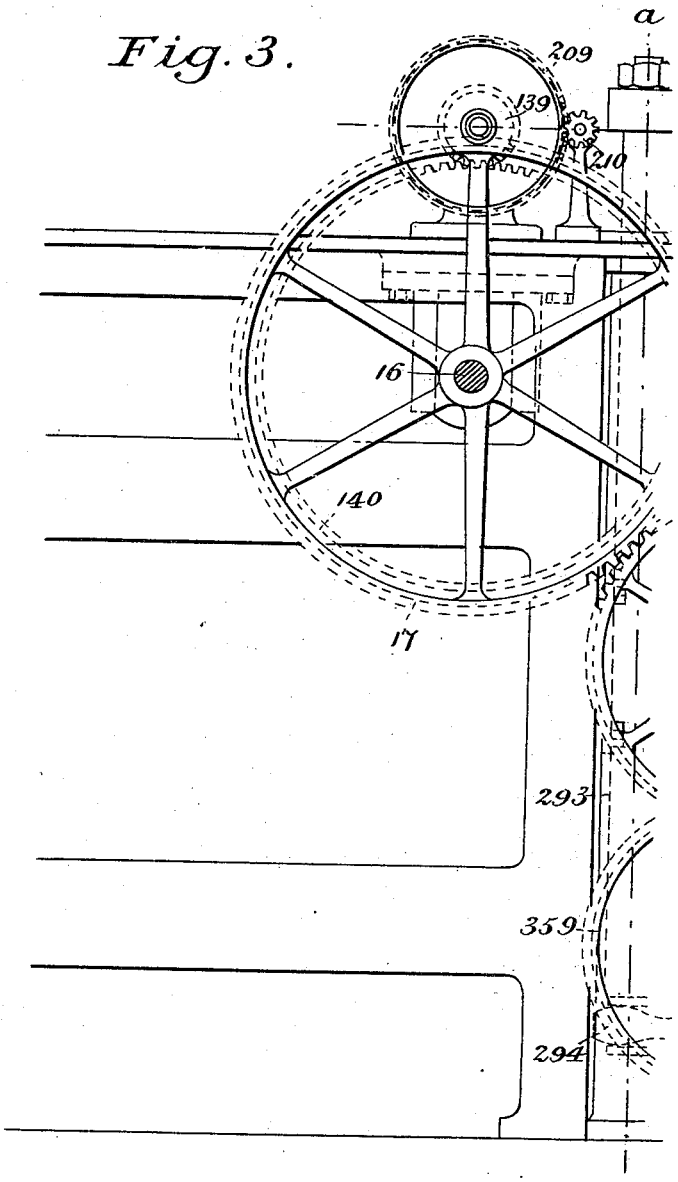

No. 630,403. Patented Aug. 8, 1899.
G. PATUREAU.
BOX MACHINE.
(Application filed Sept. 3, 1896.)
(No Model.) 35 Sheets—Sheet 13.

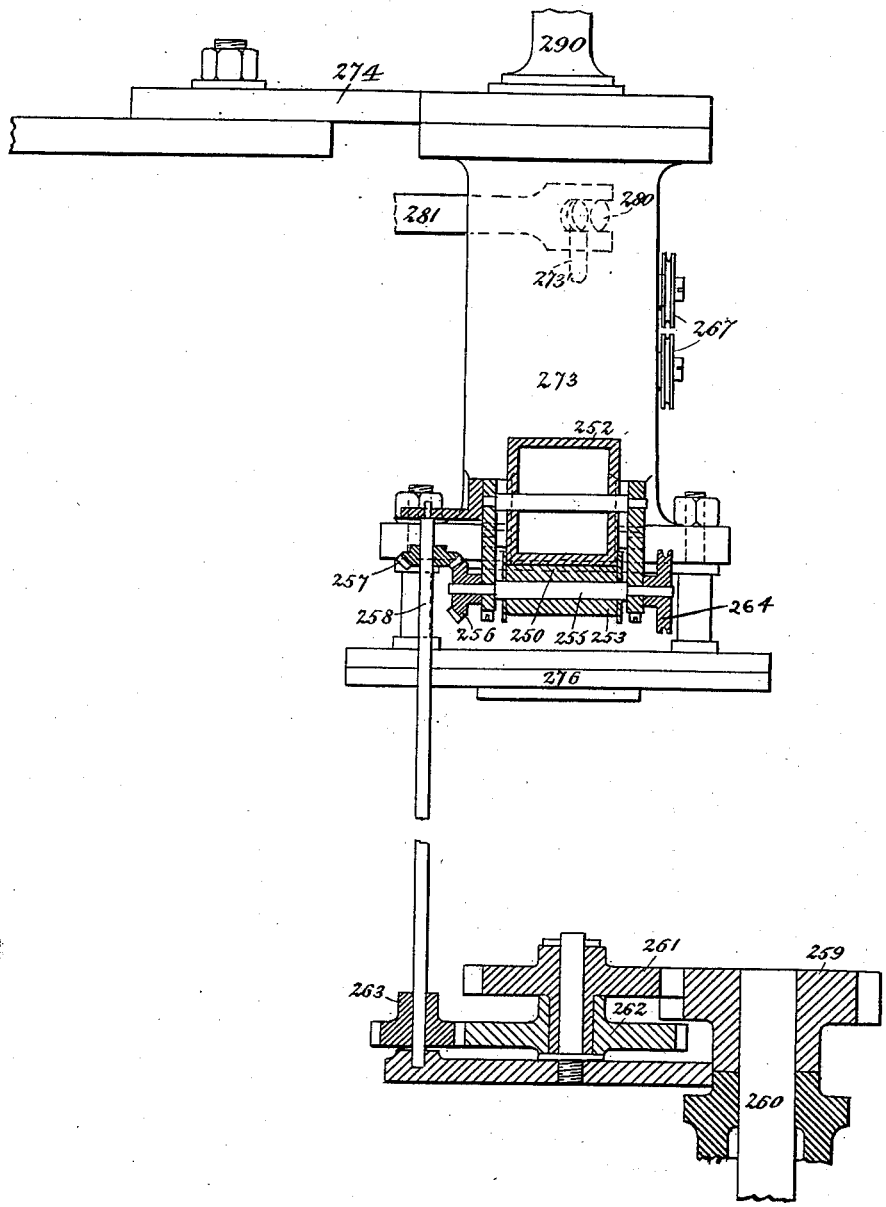

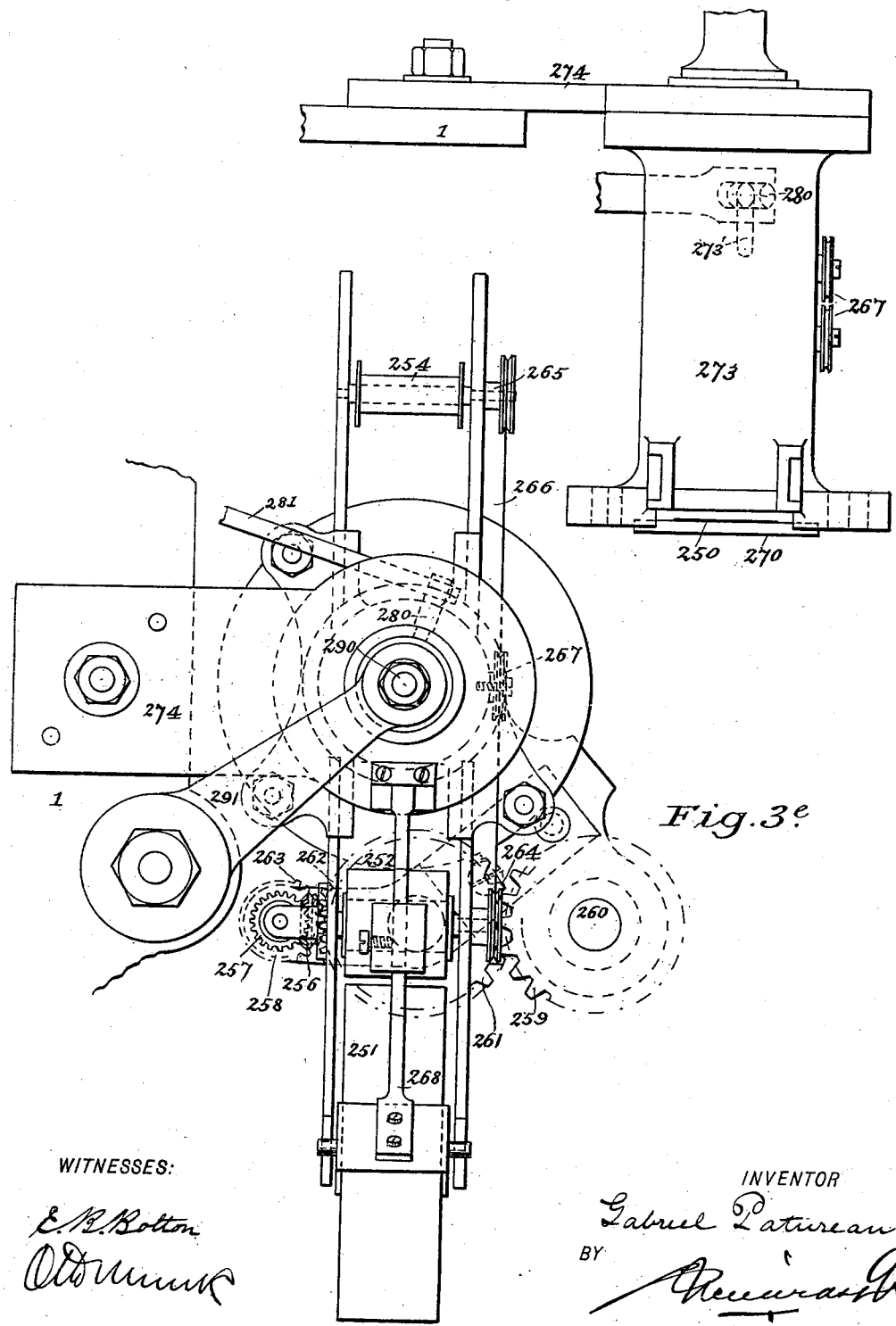

No. 630,403. Patented Aug. 8, 1899.
G. PATUREAU.
BOX MACHINE.
(Application filed Sept. 3, 1896.)
(No Model.) 35 Sheets—Sheet 16.
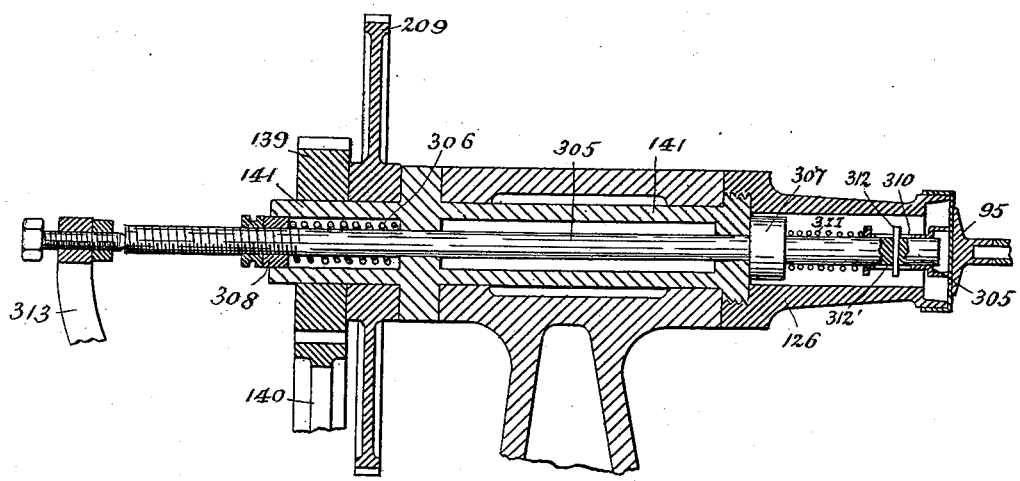
Fig. 8ª
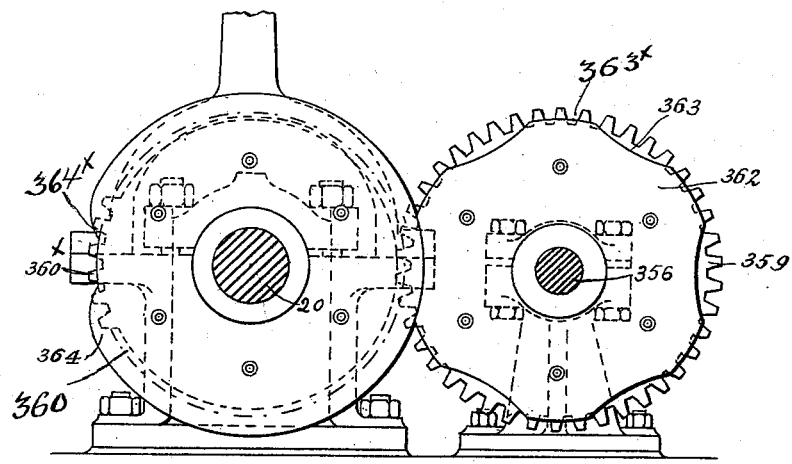
Fig. 3f
WITNESSES:
INVENTOR
Gabriel Patureau
BY
ATTORNEYS

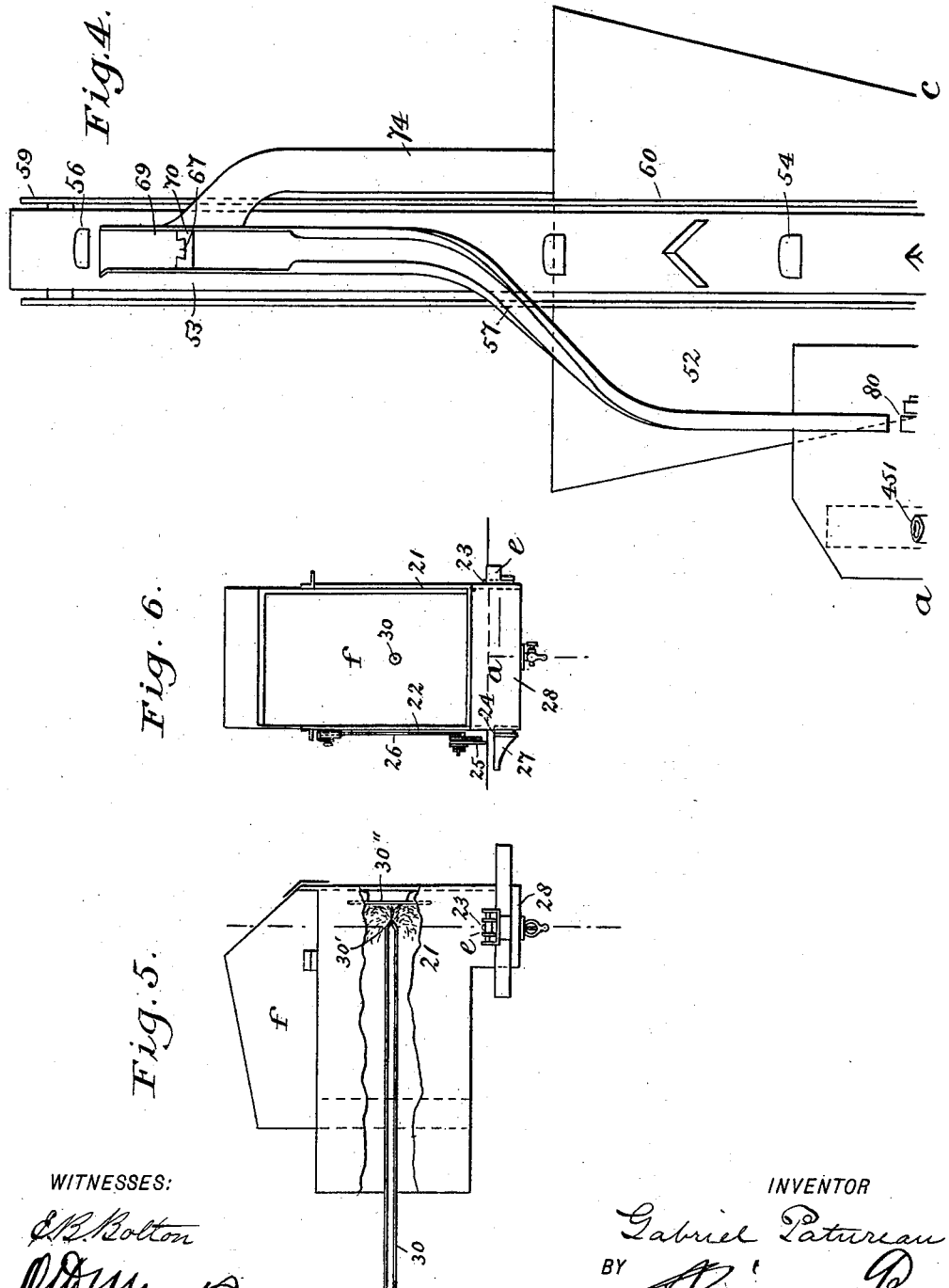

No. 630,403. Patented Aug. 8, 1899.
G. PATUREAU.
BOX MACHINE.
(Application filed Sept. 3, 1896.)
(No Model.) 35 Sheets—Sheet 18.
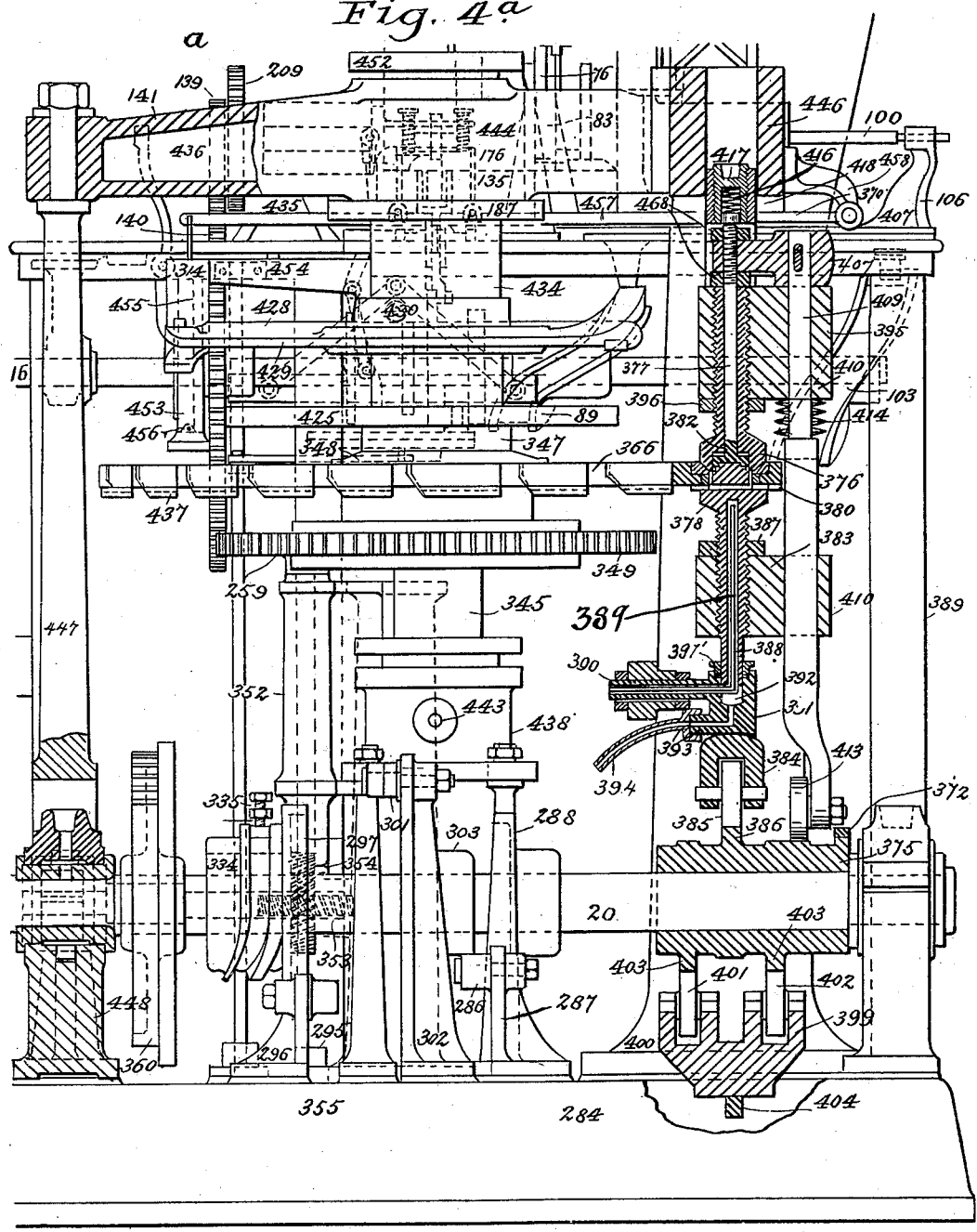
Fig. 4ª
WITNESSES:
INVENTOR
Gabriel Patureau
BY
ATTORNEYS

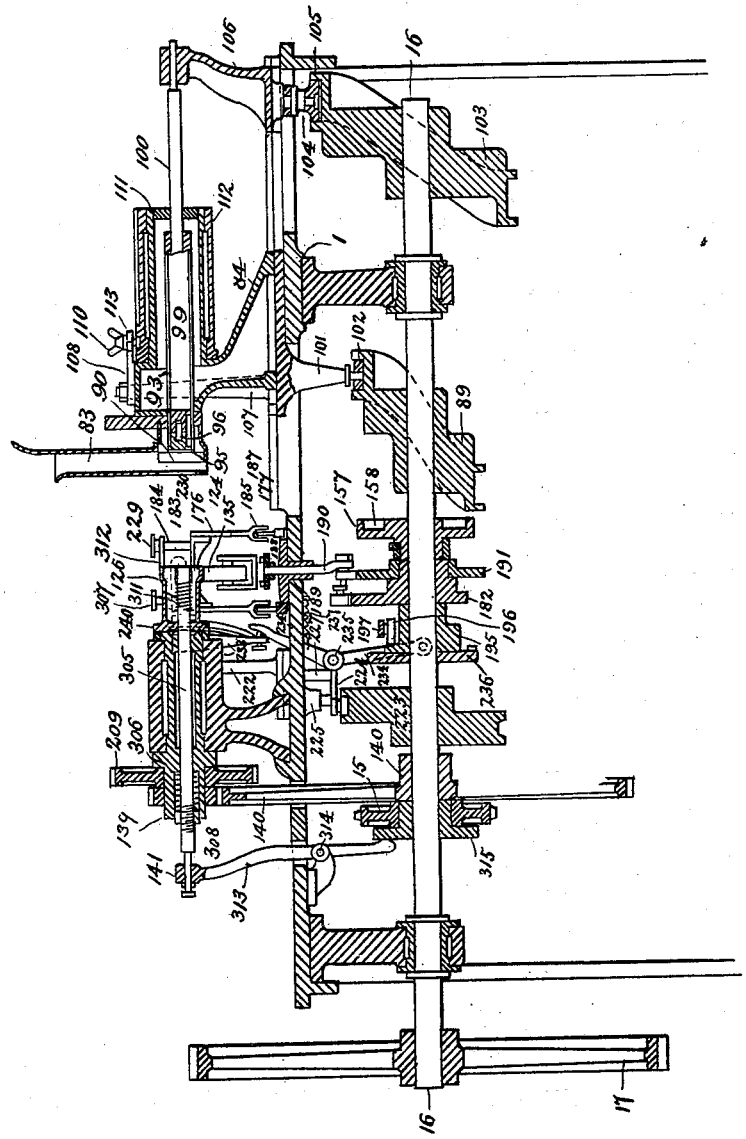

No. 630,403. Patented Aug. 8, 1899.
G. PATUREAU.
BOX MACHINE.
(Application filed Sept. 3, 1896.)
(No Model.) 35 Sheets—Sheet 20.

WITNESSES:
E. B. Bolton

INVENTOR
Gabriel Patureau
BY
ATTORNEYS

No. 630,403. Patented Aug. 8, 1899.
G. PATUREAU.
BOX MACHINE.
(Application filed Sept. 3, 1896.)
(No Model.) 35 Sheets—Sheet 21.
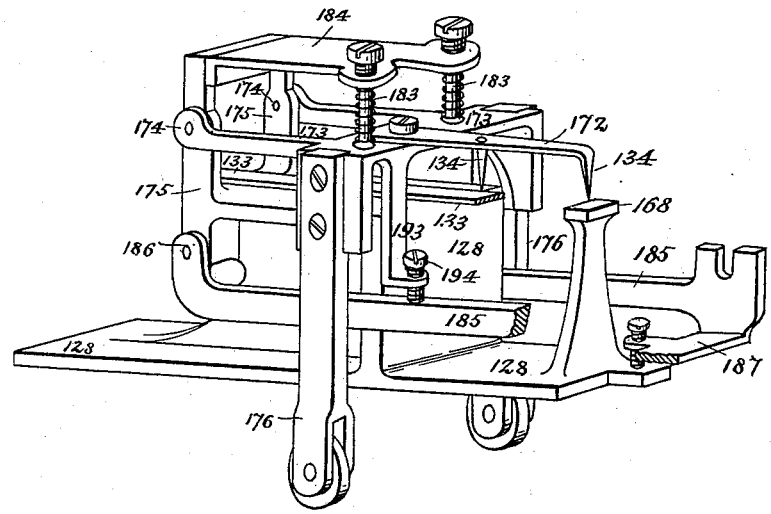
Fig. 12ᶜ
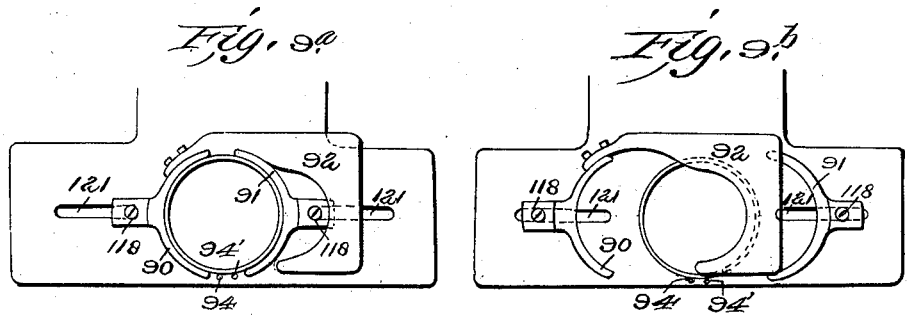
Fig. 9ᵃ  Fig. 9ᵇ
WITNESSES: INVENTOR
E. B. Bolton Gabriel Patureau
BY
ATTORNEYS No. 630,403. Patented Aug. 8, 1899.
G. PATUREAU.
BOX MACHINE.
(Application filed Sept. 3, 1896.)
(No Model.) 35 Sheets—Sheet 23.
Fig. 12.
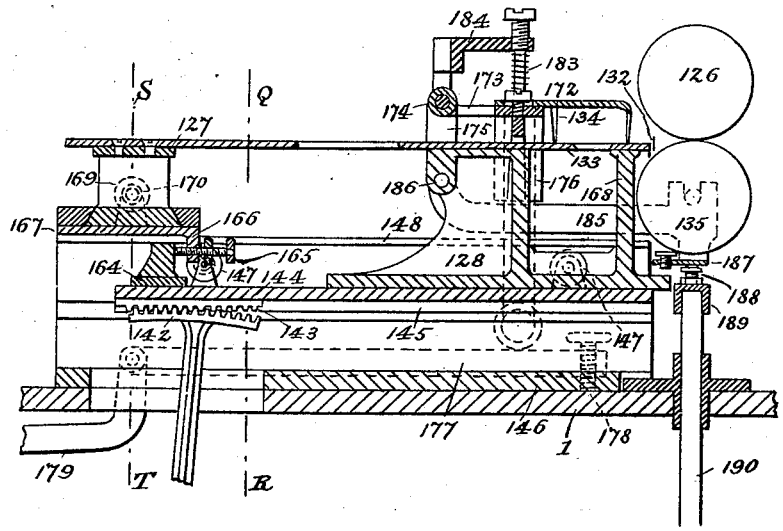
Fig. 13.
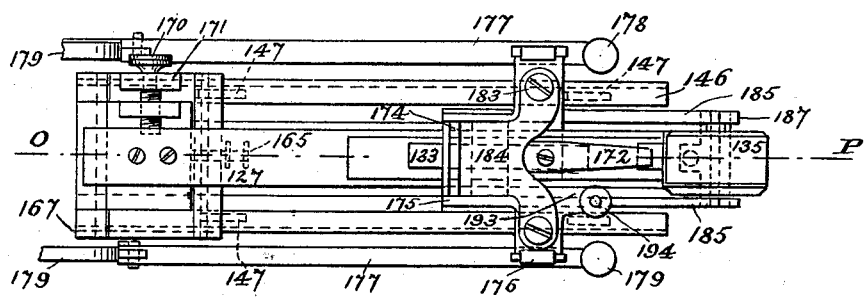
WITNESSES:
INVENTOR
Gabriel Patureau
BY
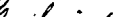
ATTORNEYS
THE NORRIS PETERS CO., PHOTO-LITHO., WASHINGTON, D. C.

No. 630,403. Patented Aug. 8, 1899.
G. PATUREAU.
BOX MACHINE.
(Application filed Sept. 3, 1896.)
(No Model.) 35 Sheets—Sheet 24.
Fig. 12ª
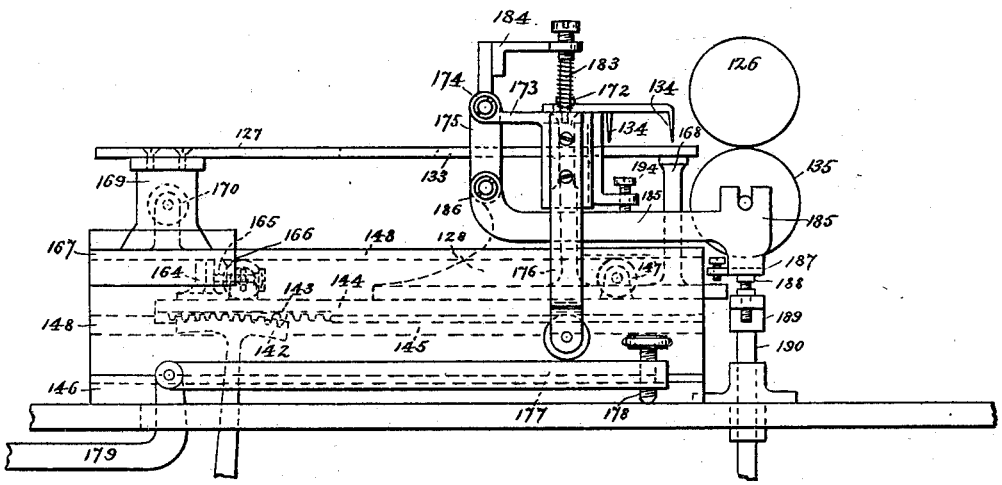
Fig. 12ᵇ
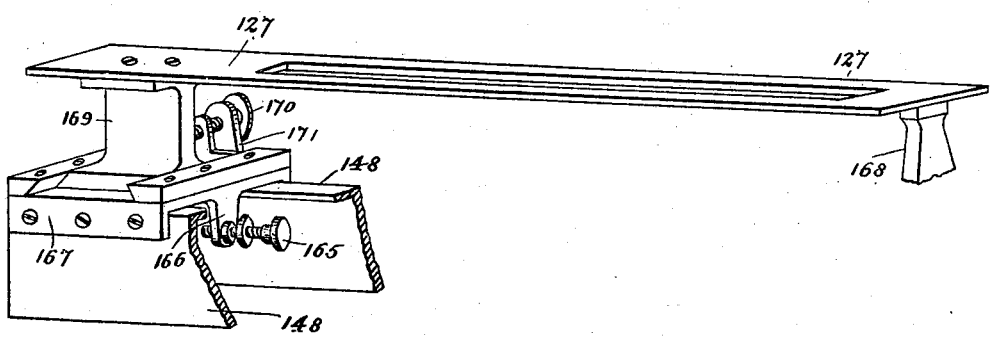
WITNESSES: INVENTOR
Gabriel Patureau
BY
ATTORNEYS
THE NORRIS PETERS CO., PHOTO-LITHO., WASHINGTON, D. C.

No. 630,403. Patented Aug. 8, 1899.
G. PATUREAU.
BOX MACHINE.
(Application filed Sept. 3, 1896.)
(No Model.) 35 Sheets—Sheet 25.
Fig. 14.
Fig. 15.
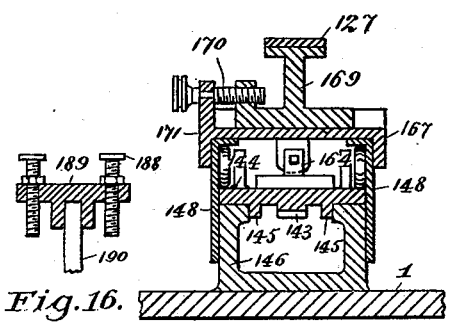
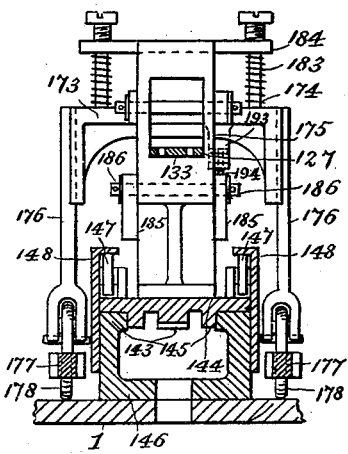
Fig. 16.
Fig. 17.
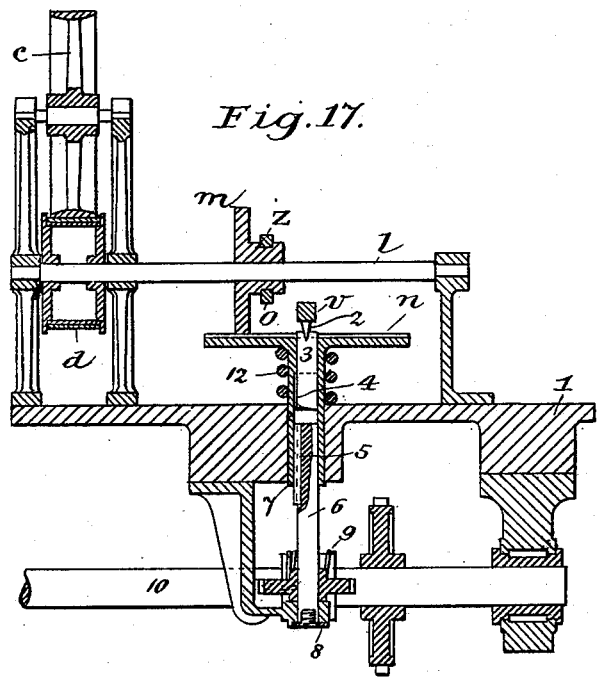
WITNESSES:
E. B. Bolton
INVENTOR
Gabriel Patureau
BY
ATTORNEYS
THE NORRIS PETERS CO., PHOTO-LITHO., WASHINGTON, D. C.

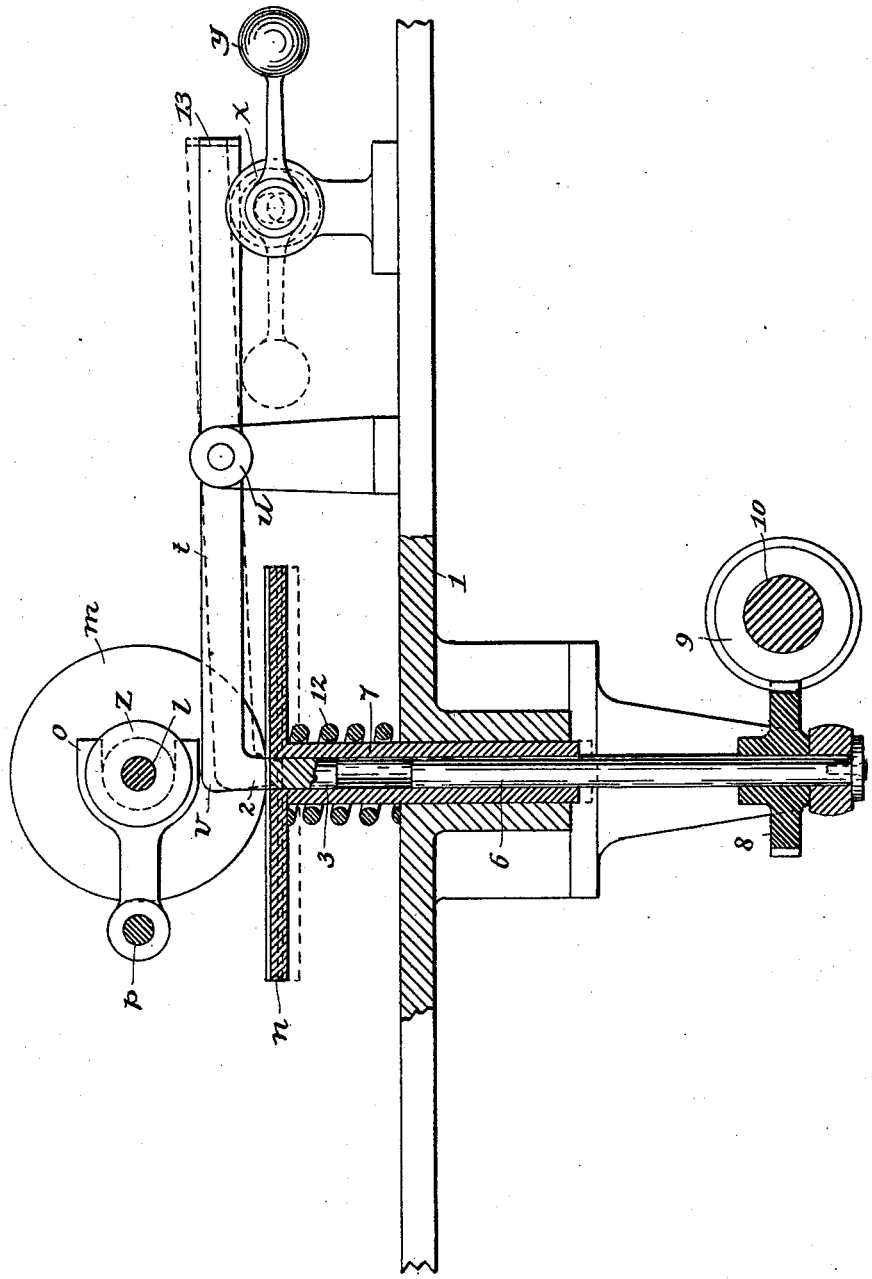

No. 630,403. Patented Aug. 8, 1899.
G. PATUREAU.
BOX MACHINE.
(Application filed Sept. 3, 1896.)
(No Model.) 35 Sheets—Sheet 27.

No. 630,403. Patented Aug. 8, 1899.
G. PATUREAU.
BOX MACHINE.
(Application filed Sept. 3, 1896.)
(No Model.) 35 Sheets—Sheet 28.
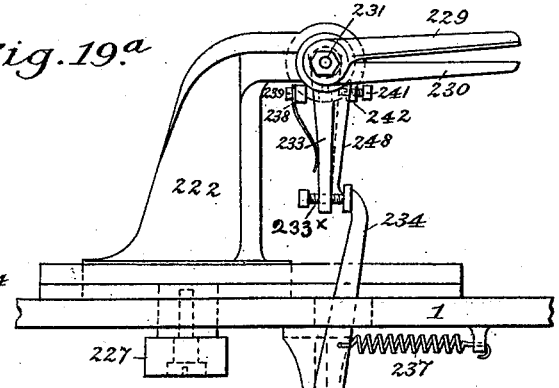
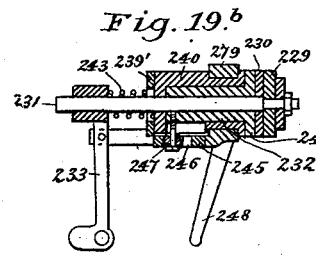
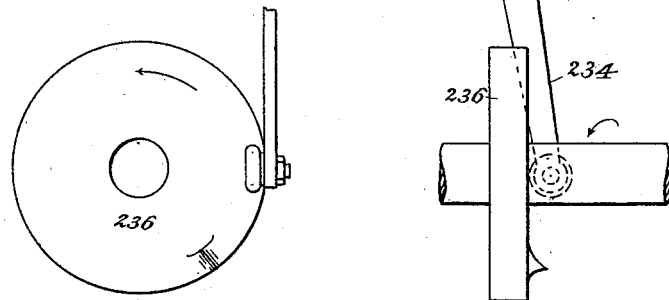
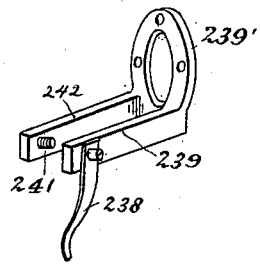
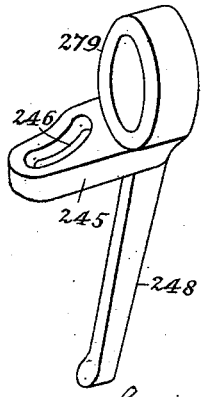
WITNESSES:
E. B. Bolton
INVENTOR
Gabriel Patureau
BY
ATTORNEYS No. 630,403. Patented Aug. 8, 1899.
G. PATUREAU.
BOX MACHINE.
(Application filed Sept. 3, 1896.)

(No Model.) 35 Sheets—Sheet 29.

WITNESSES: INVENTOR
Gabriel Patureau
BY
ATTORNEYS

No. 630,403.
G. PATUREAU.
BOX MACHINE.
(Application filed Sept. 3, 1896.)
Patented Aug. 8, 1899.
(No Model.)
35 Sheets—Sheet 30.
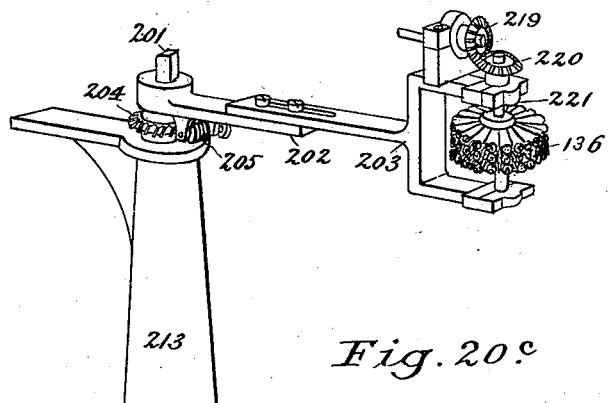
Fig. 20.ᶜ
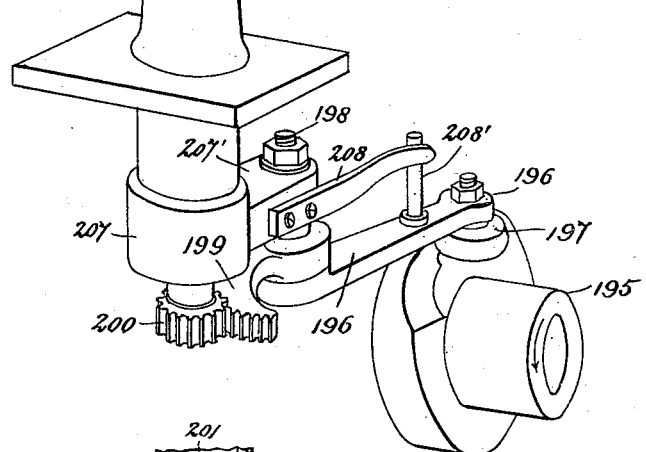
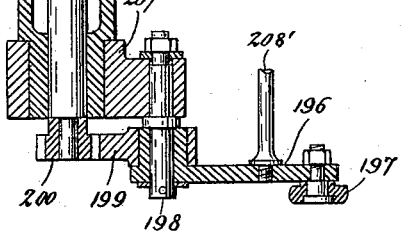
Fig. 20.ᵃ
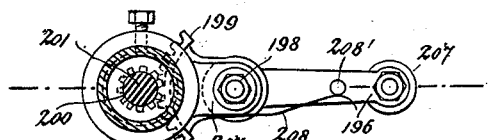
Fig. 20.ᵇ
WITNESSES:
INVENTOR
Gabriel Patureau
BY
ATTORNEYS No. 630,403.  
G. PATUREAU.  
BOX MACHINE.  
(Application filed Sept. 3, 1896.)  
Patented Aug. 8, 1899.
(No Model.)  
35 Sheets—Sheet 31.
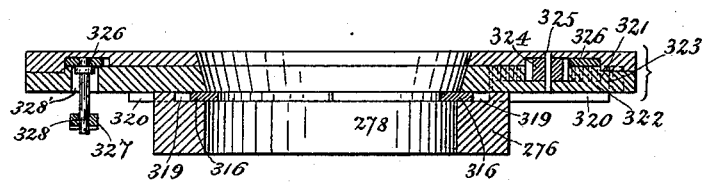
Fig. 22.
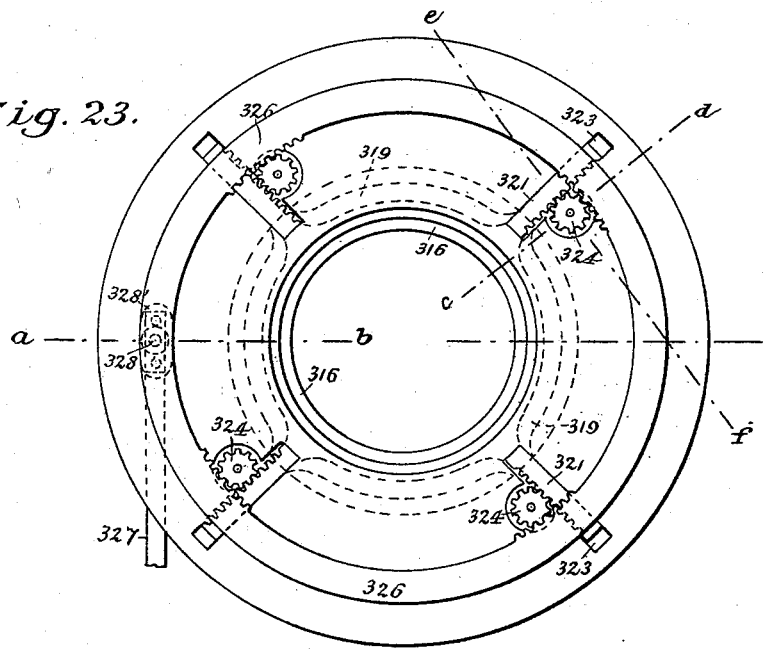
Fig. 23.
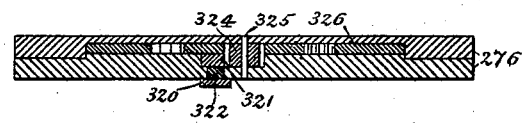
Fig. 23.ª
WITNESSES:  
E. B. Bolton
INVENTOR  
Gabriel Patureau  
BY  
ATTORNEYS No. 630,403. Patented Aug. 8, 1899.
G. PATUREAU.
BOX MACHINE.
(Application filed Sept. 3, 1896.)
(No Model.) 35 Sheets—Sheet 32.
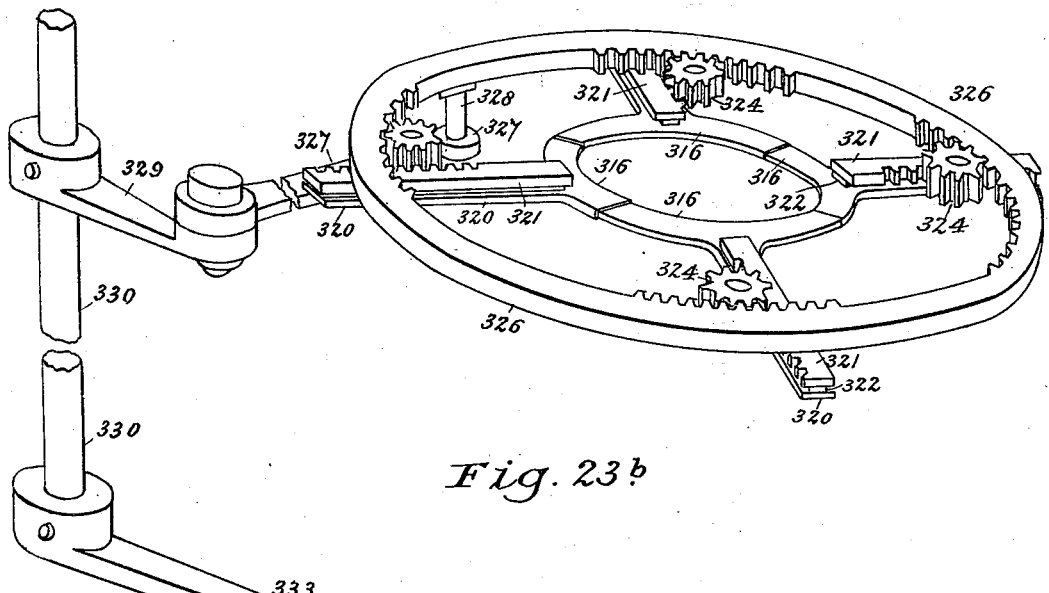
Fig. 23ᵇ
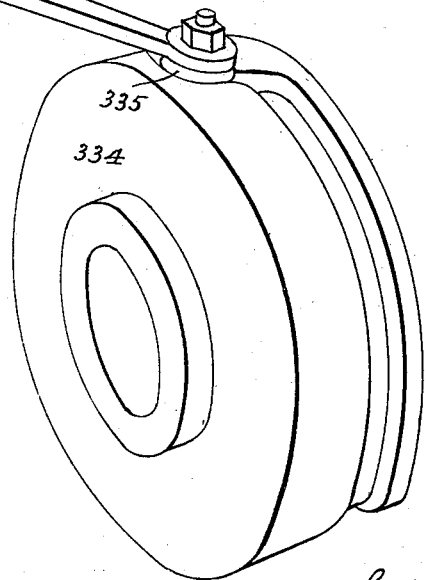
WITNESSES:
J. B. Bolton
INVENTOR
Gabriel Patureau
BY
ATTORNEYS No. 630,403.
G. PATUREAU.
BOX MACHINE.
(Application filed Sept. 3, 1896.)
Patented Aug. 8, 1899.
(No Model.)
35 Sheets—Sheet 33.
Fig. 24.
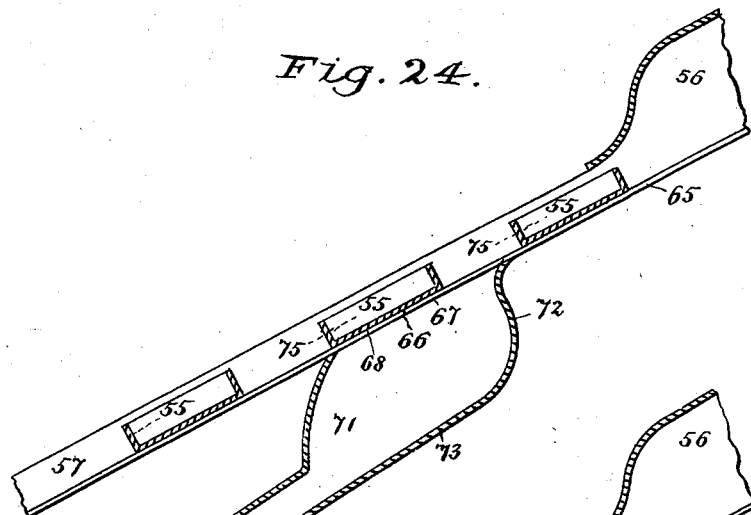
Fig. 25.
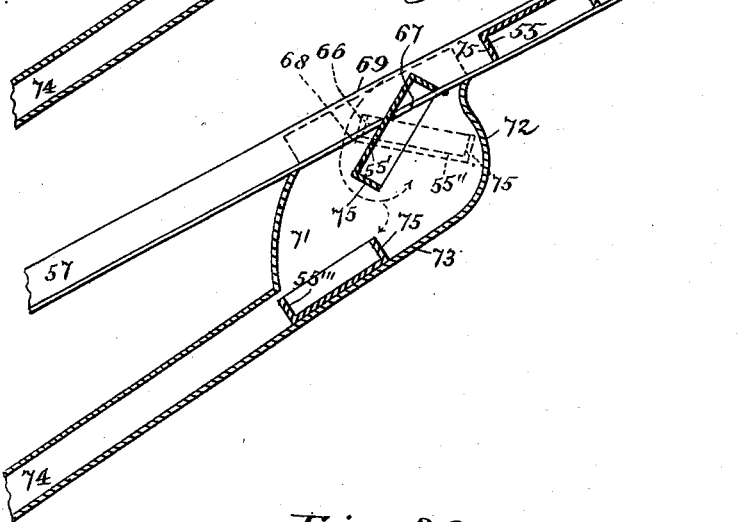
Fig. 26.
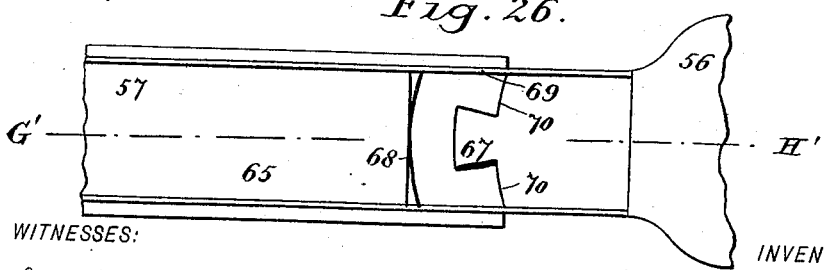
WITNESSES:
E. B. Bolton
INVENTOR
Gabriel Patureau
BY
ATTORNEYS No. 630,403. Patented Aug. 8, 1899.
G. PATUREAU.
BOX MACHINE.
(Application filed Sept. 3, 1896.)
(No Model.) 35 Sheets—Sheet 34.
Fig. 27.
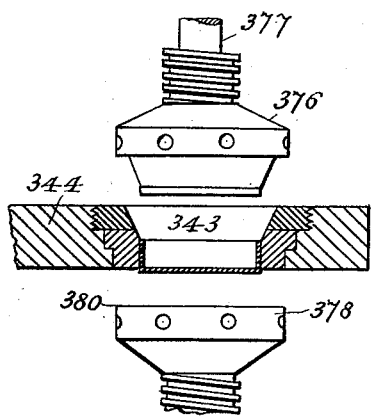
Fig. 28.
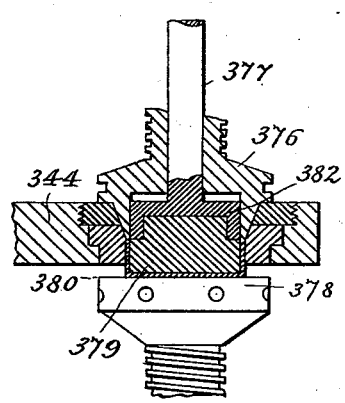
Fig. 31.
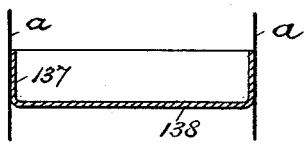
Fig. 32.
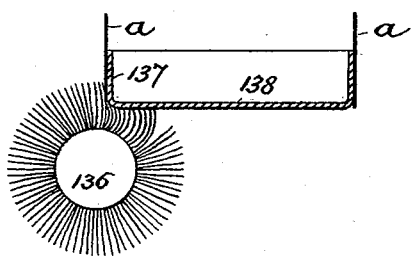
WITNESSES:
INVENTOR
Gabriel Patureau
BY
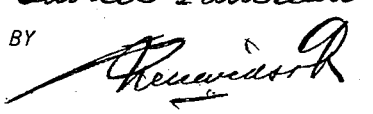
ATTORNEYS
THE NORRIS PETERS CO., PHOTO-LITHO., WASHINGTON, D. C.

No. 630,403. Patented Aug. 8, 1899.
G. PATUREAU.
BOX MACHINE.
(Application filed Sept. 3, 1896.)
(No Model.) 35 Sheets—Sheet 35.

WITNESSES:

INVENTOR
Gabriel Patureau
BY
ATTORNEYS

UNITED STATES PATENT OFFICE.

GABRIEL PATUREAU, OF PARIS, FRANCE.

BOX-MACHINE.

SPECIFICATION forming part of Letters Patent No. 630,403, dated August 8, 1899.

Application filed September 3, 1896. Serial No. 604,763. (No model.)

*To all whom it may concern:*

Be it known that I, GABRIEL PATUREAU, a citizen of the Republic of France, residing at Paris, France, have invented certain new and useful Improvements in Machines for Shaping and Covering Boxes or Capsules of Cardboard and other Materials, of which the following is a specification.

This invention has been patented in France December 5, 1895, No. 252,222; in Great Britain December 19, 1895, No. 24,380; in Germany December 31, 1895, No. 7,882, and in Austria January 7, 1896, No. 46/2,179.

The invention has been patented in part in Germany, No. 74,236, dated April 1, 1894.

The present invention relates to a machine for making boxes of cardboard, the functions of which are about the same as that which constitutes the subject-matter of my United States Patent No. 513,528 of January 30, 1894, the mechanism in the present invention being modified to render the machine more efficient and economical. I have improved the mechanism greatly by feeding automatically the already-stamped box-shell instead of doing so by hand, which saves manual labor, and all the operations, feeding, and manufacturing are done automatically.

The objects of the new machine are, first, to paste paper strips, previously printed and sized, while corrugating the same, against the outside of stamped shells or bodies of cardboard or other material having a cylindrical, an oval, or other shape; second, to bend down inside the shell the paper which has been pasted and corrugated upon the outside of the same; third, to paste a disk of paper or other material, previously printed and sized, upon the bottom of the shell or body, and, fourth, to stamp the capsule or shell, providing the same with a rim or not, as desired, which while making the bottom rigid gives it an elegant aspect. This fourth operation completes definitely the half of the box as it comes out of the machine.

A fifth function performed by the machine consists in supplying the bottom to the stamped capsules or shells before expelling the same from the machine.

By my present machine I am enabled to make boxes of a less number of pieces than heretofore. Besides, while with boxes made by hand the paper is used both for ornamenting and as a fixing agent of the bottoms to the side with the boxes coming out of my machine the paper only serves for ornamentation.

Figure 8:
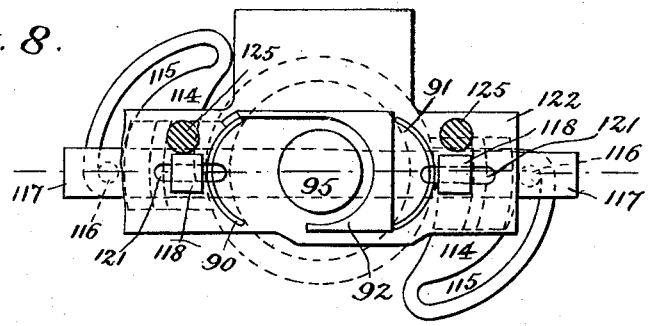
Figure 9:
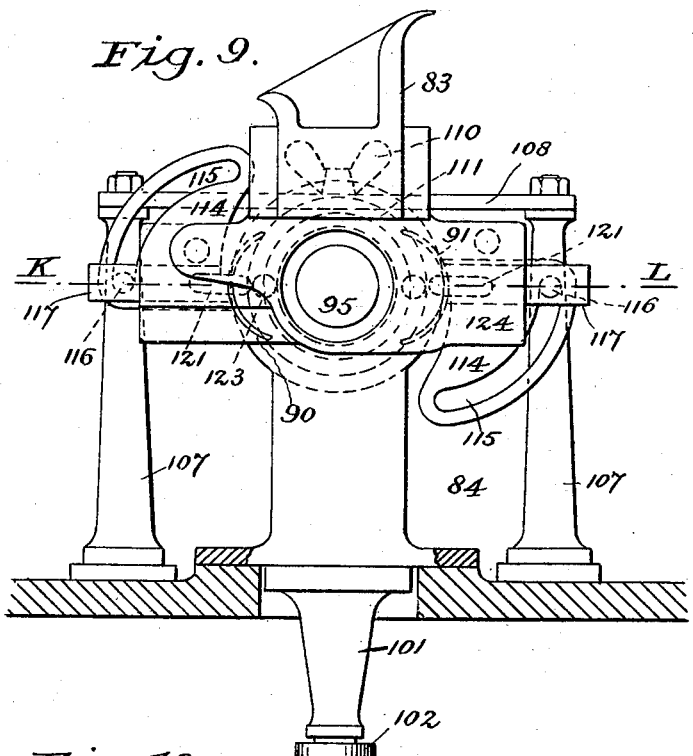
Figure 10:
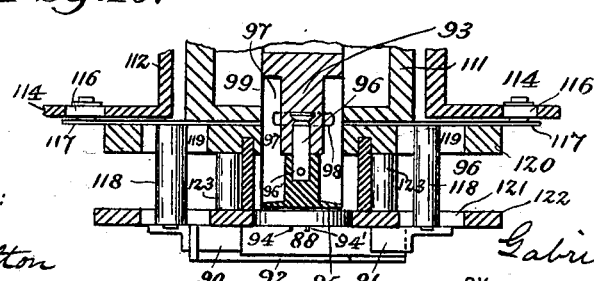
Figure 11:
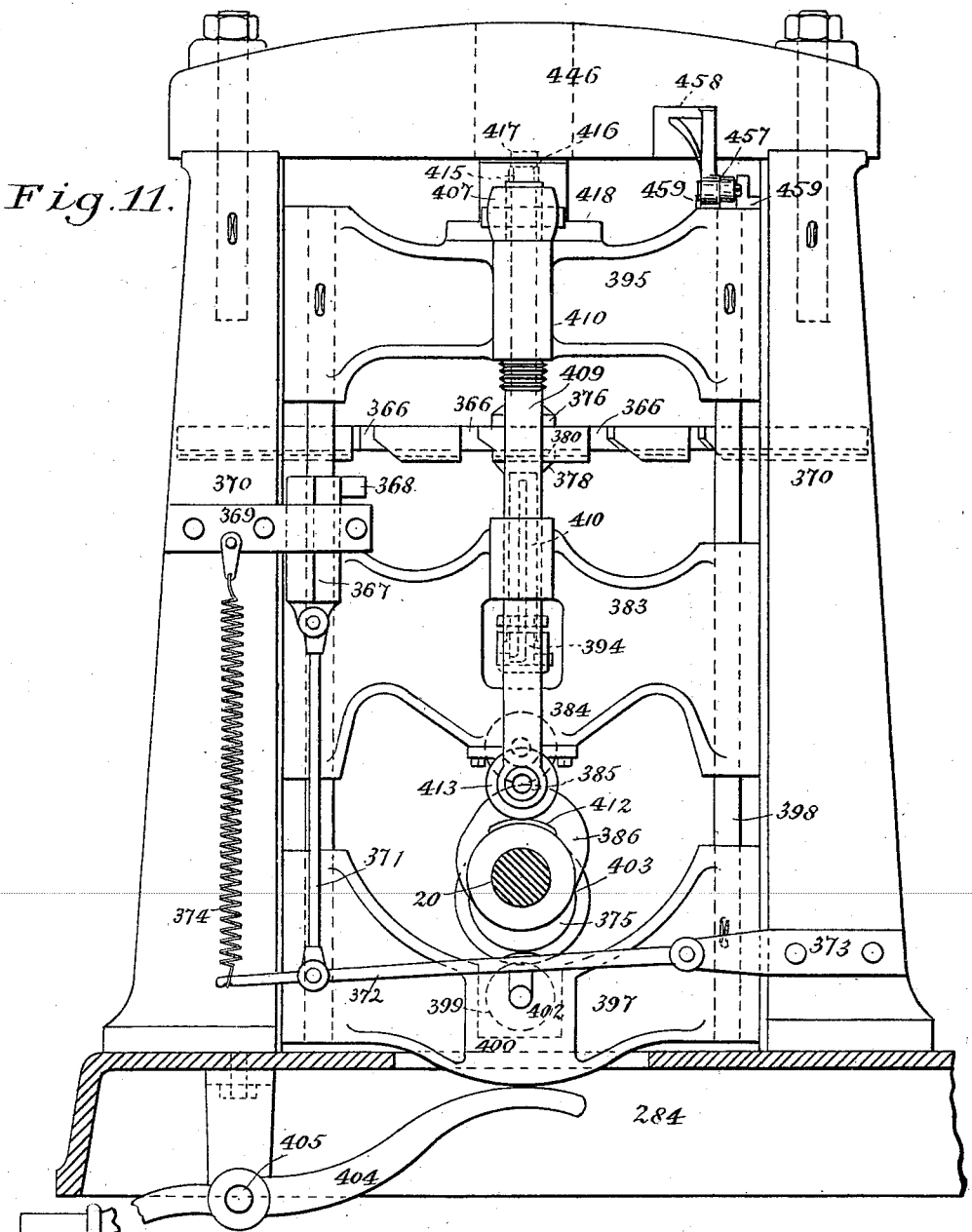
Figure 18:
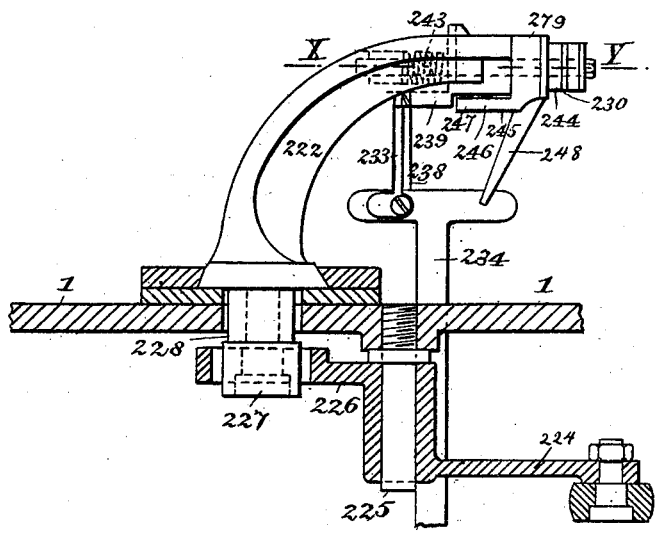
Figure 19:
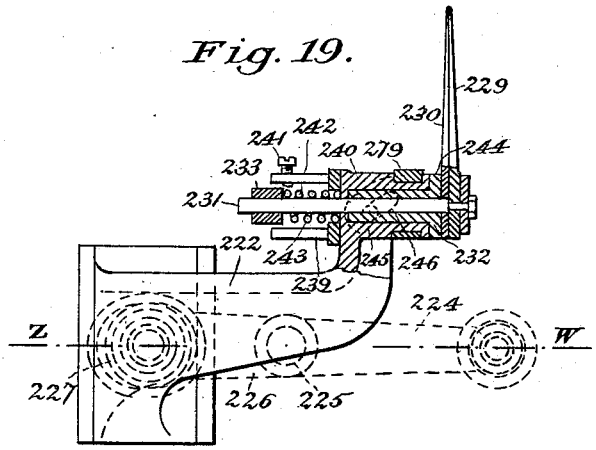
Figure 20:
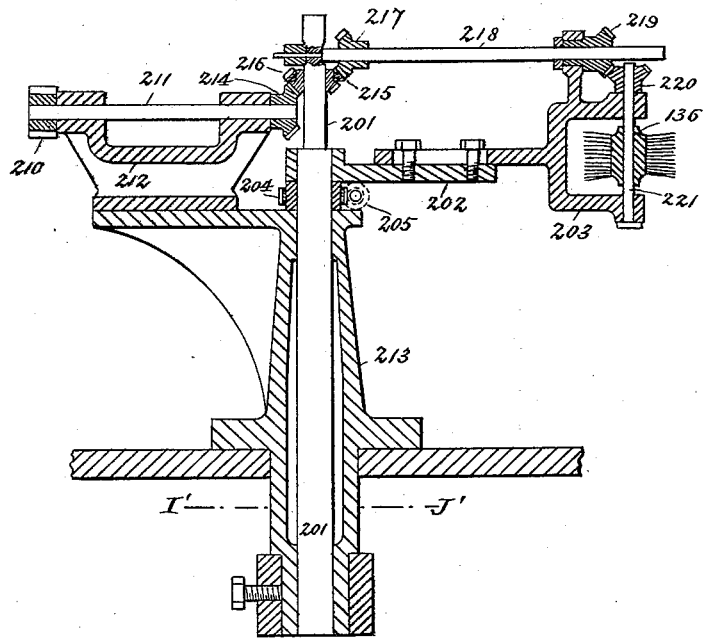
Figure 21:
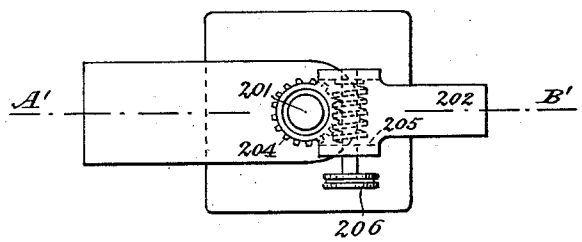
Figure 29:
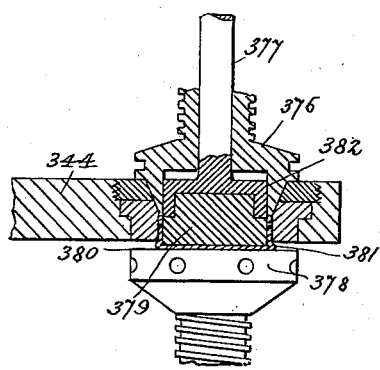
Figure 30:
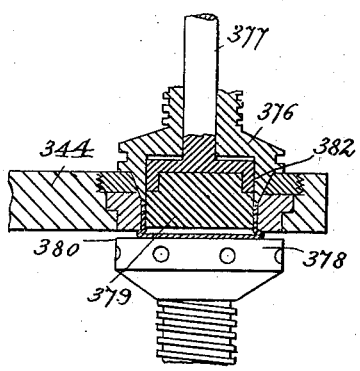
Figure 33:
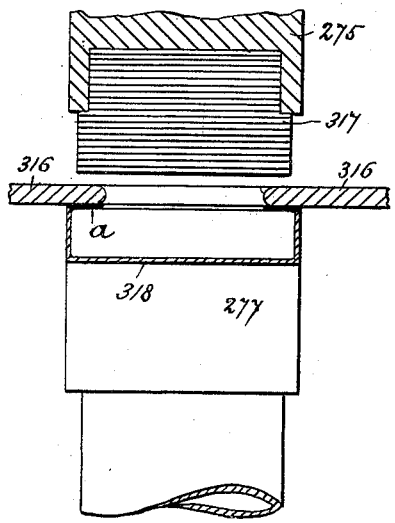
Figure 34:
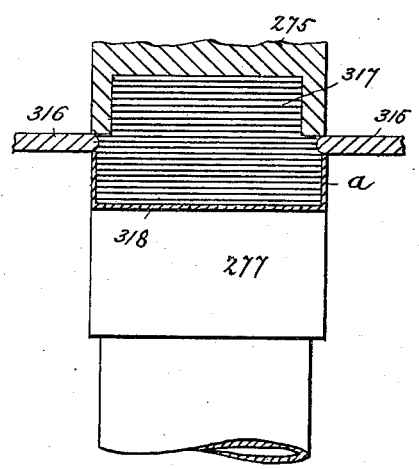

In the accompanying drawings, Figures 1, $1^a$, $1^b$, and $1^c$ combined show a view in elevation and longitudinal section on the lines A B, C D, E F, Figs. 2, $2^a$, and $2^b$. Fig. $1^d$ is a perspective view of the cock with operating means therefor. Fig. $1^e$ is a sectional view of the cock. Fig. $1^f$ is a detail view relating thereto. Fig. $1^x$ is a sectional detail view relating to the means for dressing the capsules. Fig. $1'$ shows a rear view of the gearing of the toothed sector 142, which actuates the gluing-carriage; Fig. $1''$, a front view of the operating device of the cock. Figs. 2, $2^a$, and $2^b$ show a plan view of the same machine. Fig. $2'$ shows a vertical sectional view of the operating mechanism for feeding the paper out of which the disk is cut, the section being taken on line $2'$ $2'$ of Fig. $2^b$. Figs. 3 and $3^a$ are elevations of the part of the machine containing the driving-gear. Figs. $3^b$ and $3^c$ are detail views relating to the means for feeding the strip of material to be cut. Fig. $3^d$ is a vertical sectional view showing the punch for cutting the disks from the strip. Fig. $3^e$ is a plan view of the punch mechanism and the means for feeding the paper strip. Fig. $3^f$ is a detail view of the gearing, showing at the lower part of Fig. $3^a$. Figs. 4 and $4^a$ show an end view of the machine at the side of the stamping device with a section on the line G H, Fig. 2. Fig. 5 is an elevation view of the box $f$ in which the moistening of the previously-sized paper strips is done. Fig. 6 is an end view thereof. Fig. 7 is a sectional view on the line I J of Fig. $2^a$. Fig. 8 is a face view of part of the transporting-carriage 84, the plate 124 being removed to show the prongs 90 91. Fig. $8^a$ is a detail view in section of the capsule held between the mandrel and the piston. Fig. 9 is a front view of the transporting-carriage 84. It is that carriage which seizes the shells coming from the automatic feeder and carries the same to the rotary mandrel 126. Figs. $9^a$ and $9^b$ are detail views illustrating the action of the appendix. Fig. 10 is a section on the line K L of Fig. 9. Figs. $10^a$ and 10$^b$ are detail views relating to a dressing-brush and the movable head for operating in connection with the capsule. Fig. 11 shows the part of the machine in which the rim of the shell is made. The figure represents a section of the frame of the machine on the line 11 11 of Fig. 2$^b$. Figs. 12, 12$^a$, 12$^b$, 12$^c$, 13, 14, 15, and 16 illustrate the gluing-carriage. Fig. 12 is a section thereof on line O P, Figs. 2$^a$ and 13. Fig. 12$^a$ is a side view of the parts shown in Fig. 12. Fig. 13 is a plan view of Fig. 12. Fig. 14 is a section on line S T, Fig. 12, and Fig. 16 is a front view of the extremity of the lifting-rod of the pressing-roller 135. Fig. 17 is a sectional view on line U V of Fig. 2 of mechanism for feeding the paper strips serving for the dressing of the shells. Fig. 17$^a$ is a detail side view, partly in section, of the mechanism shown in Fig. 17. Figs. 18 and 19 illustrate the shears and device for operating the same. Fig. 18 is a sectional rear view thereof on the line Z W of Fig. 2, and Fig. 19 is a plan view and sectional view on line X Y of Fig. 18. Fig. 19$^a$ is a side view of the shears with their operating mechanism. Fig. 19$^b$ is a sectional view along the axis of the shears. Figs. 19$^c$, 19$^d$, and 19$^e$ are detail views relating to the shear mechanism. Figs. 20, 20$^a$, 20$^b$, 20$^c$, and 21 illustrate the brush for corrugating the paper outside of the shell and the mechanism for operating the same. Fig. 20 is a section on the line A' B', Figs. 2$^a$ and 21. Figs. 20$^a$ and 20$^b$ are detail sectional views relating to the brush mechanism, the latter being a section on line I' J' of Figs. 20 and 20$^a$. Fig. 20$^c$ is a perspective view of the brush mechanism. Fig. 21 is a plan view of the frame 213 and of the plate or disk fixing the support of the brush. Figs. 22 and 23 show the turning-down plate. Fig. 22 is a sectional view on the line $a\ b\ c\ d$, Fig. 23, and Fig. 23 a plan. Fig. 23$^a$ is a section on line $e\ f$ of Fig. 23. Fig. 23$^b$ is a perspective view of the operating parts of Figs. 22 and 23 with the framework omitted. Figs. 24, 25, and 26 illustrate the arrangement at the entrance of the distributing-passage near the hopper. The object of this arrangement is to throw out the shells which do not present themselves in the proper direction. I mean bottom down. Figs. 24 and 25, in which sections are shown on the line G' H' of Fig. 2, and Fig. 26 illustrate the cases that can occur. In Fig. 24 the shells are in the proper position. In Fig. 25 they are not. Fig. 26 is a plan view of the parts shown in Figs. 24 and 25. Figs. 27, 28, 29, and 30 show the respective position of the two stamping-pistons 376 and 378 during the stamping period. In these figures the plate 344 and the shell are shown in sectional view on the vertical plane passing through the diameter of the upper piston. Figs. 31 and 32 show the phases of corrugation of the paper outside the shell. In Fig. 31 the paper strip is pasted outside, yet not corrugated, and in Fig. 32 the brush is effecting the corrugation. Figs. 33 and 34 are sectional views showing the operation of the parts bending down the paper into the interior of the box.

Operations: The various operations of the machine are as follows: first, the feeding of the paper strip, having previously been printed upon and sized, the object of which is to dress and decorate each shell; second, moistening the glue on said strip, which has previously been printed upon and sized; third, feeding and automatic distribution in the right position of the shell, stamped beforehand, from the hopper into the vertical passage to the transporting-carriage; fourth, shaping and mounting of the shells upon the rotary mandrel; fifth, seizing of the extremity of the moistened paper strip and feeding of the same to the mandrel for dressing, gluing, and corrugating said strip upon the shell; sixth, cutting off of the paper strip after it has been pasted upon the shell; seventh, feeding of the paper strip, sized beforehand, out of which a disk must be cut for the outside decoration of the shell; eighth, cutting out of the disk and feeding of the same into the socket of the turning-down plate placed under the same; ninth, ejecting of the shell from the mandrel after it has been glued and corrugated and dropping of the same in the socket of the turning-down plate, which already holds the paper disk; tenth, turning down and pasting of the paper inside the shell and partial gluing of the outside disk; eleventh, feeding of the shell to the stamping device; twelfth, stamping of the shell in order to produce a rim or not and final gluing of the outside paper disk; thirteenth, dressing of the bottoms of the shells; fourteenth, final expulsion of the completely-shaped shells.

*First operation—Feeding of the paper strip, previously printed upon and sized, the object of which is to dress and decorate each shell,* (Figs. 1, 2, and 17 for the details.)—The paper strip $a$, stored upon a drum $b$, the flanges K of which guide the same, passes between the two cylinders $c$ and $d$, which carry the same along and convey it to the moistening device, where it arrives after having passed around a guide $g$ and a roller $e$, both of which are placed upon the outside of the box wherein the strip $a$ is moistened.

The carrying along of the strip $a$ by the cylinders $c$ and $d$ occurs as follows: The cylinder $d$, which is fitted out with felt, alone has a continuous rotary motion. Its motion is caused by the shaft $l$, upon which it is fixed, said shaft $l$ itself being actuated by a roller $m$, operated by the rotary plate $n$, against which it rests. The roller $m$ can move away from and come nearer the center of the plate, so that the speed of its motion will be less great or greater according to its position in relation to that center by means of the fork $o$, the two arms of which are placed in a groove $z$, made upon the socket of the roller $m$. The fork $o$ has a motion parallel to the shaft $l$ by means of the screw $p$, upon whose unthreaded part it is fixed. The screw $p$ is operated by a nut $q$, that can revolve in a support $r$, fixed upon the table 1 of the machine. It will be understood that by making $q$ turn, the screw $p$, which cannot turn, being prevented therefrom by the fork $o$, will be displaced in a direction rectilinear to the direction of its axle, while its unthreaded extremity will slide in a support $s$, also placed upon the table 1.

It being absolutely necessary at times to stop the feeding of the strip $a$ without stopping the motion of the principal shafts of the machine the plate $n$ is operated as follows: The socket 7, Fig. 17, which prolongs said plate, can turn freely and slide in a hole made in a boss of the table 1, and a spiral spring 12 presses constantly said plate against the roller $m$ in order that the latter may operate. In order to stop the motion thereof, it will thus be necessary to lower the plate $n$, and thereby to act upon the spring 12. This is done by means of the lever $t$, pivoted at $u$, one of the extremities $v$ of which is provided with a point 2 and acts upon the part 3, fixed to the center of the plate $n$, while its other extremity 13 is lifted by means of a cam $x$, operated by the handle $y$. The plate $n$ receives its motion from the shaft 6 through the intermediary of a key 5, wedged upon the latter, and of a groove 4, made in the socket 7 of the said plate. A wheel 8, fixed upon the shaft 6, engages with a worm-screw 9, fixed upon the shaft 10, which is put in rotary motion by the shaft 16 through the intermediary of the wheels 11 and 15 and its endless chain 14.

*Second operation—Moistening of the strip printed upon and sized beforehand,* (Figs. 1, $1^a$, $1^d$, $1^e$, $1^f$, $1^u$, 2, and 4, 5, and 6.)—We have left the strip $a$ after it had passed over the last guiding-roller $e$, the support of which is fixed upon the box $f$. As the conveying of the strip to the moistening device by means of the rollers $c$ and $d$ is done in a continuous manner and as, on the other hand, (operation five,) the strip $a$ is seized, and thus actuated only at intervals by the gluing-carriage, between the rollers $e$ and the rotary mandrel, said strip will form a loop in the space between the rollers $c$ and $d$ and the guide during the interval of time comprised between the periods when the paper is sized by the gluing-carriage. This loop of paper will be of a sufficient length for the dressing of the next shell. After having passed over the roller $e$ the strip $a$ passes into the box $f$ through a small rectangular opening 23 made in the wall 21. It passes through this box, in which it is sufficiently moistened, and comes out of the same through another opening 24 made in the wall 22. After having come out of the box $f$ the strip $a$ meets a felt brush 25, fixed upon a flexible blade 26, the object whereof is to remove the excess of water from said strip. A cup 27, wherein the water collects, communicates with the bottom 28 of the box $f$, where a cock is placed which allows the excessive water to run out. The opening between the cup and the box is indicated at 24' in Fig. $1^a$. After the strip has thus been freed from the excessive water the strip $a$ is led to the gluing-carriage, passing through the guiding-channel $h$, where we will leave the same until the fifth operation is to be performed.

I will now describe the distribution and the feeding of the water, which, being atomized, is used for moistening the glue of the strip. To that effect the water under pressure is led through a pipe $i$ to a cock 29, which is attached to a table 1 by two links and which distributes the same intermittently in a pipe 30, with an opening 30' of very small diameter, whence the water is projected on a plate 30'', where it breaks into finely-atomized spray. The cock 29, which is opened intermittently at each turn of the shaft 10 during the time that the motion of the strip has stopped in the box $f$—I mean during the dressing period of one shell—is operated as follows: A cam 31 upon the shaft 10 has for its object to raise suddenly and thereafter release one of the arms 32 of a lever linked at 33 upon a support fixed under the table 1 of the machine. This arm 32 carries a balance-weight 37, which insures contact with cam 31. The other arm 34 of this lever acts in turn upon a lever 35, which is pivoted at one end at 36. The lever 35, through the intermediary of the two rollers fixed in a cap 39, actuates a rod 38, which has a rectilinear motion, being guided in two half pillow-blocks 42, fixed on the table. One of these has a notch cut into it to allow for the passing of rack 44. Support 43 is also fixed on the table. A rack 44 is formed on the rod 38 and a bolt 40 is fixed upon the same, against which strike the diametrically-opposed stops 48 of a click and pawl-box 47. The rack has for its object to operate the key of the cock for opening the same and the bolt to stop said key at a determined closed position. The rack 44 actuates a pinion 41 upon the case of a cam 45 having three teeth and loose upon its shaft 46, which is fixed upon the key 51 of the cock 29. A metal box 47, outside of which the two diametrically-opposed stops 48 have been arranged, is wedged upon the shaft 46. A small cylinder 49 is placed in the free space between each tooth inside the box. Springs 50 inserted in each tooth push the little cylinders toward the pointed space between the tooth and the box. It will be easily understood that when the cam 45 turns from left to right, Fig. 1''—that is, when the rod 38 ascends—the cylinders will turn without carrying along in their motion the box 47, while when the rotation takes place from right to left the spring 50 will help the wedging of the cylinders 49 between the teeth of the cam and the circular wall of the box 47. The latter, as well as the key 51, will then follow the motion of the cam 45 and the cock will open. When the rod 38 rises, the bolt 40 is lifted without the rack actuating the box 47, and the stop 48, which had engaged with the same, is released, so that when the rod descends under the action of the cam 31, whereby the speed is kept always constant no matter how the machine runs, the pinion 41 will turn, and thereby the cam 45, the box 47, and the key 51 of the cock. The latter having made one half-revolution the other stop 48 will have reached its highest point and will strike against the bolt 40, which has come down at the same time as the rod 38. The rod 38 is raised by the action of the weight 37, connected with the lever 32.

*Third operation—Automatically feeding and distributing in the right position of the previously-stamped shells from the hopper into the vertical passage of the transporting-carriage,* (Figs. 1, 2, 4, 24, 25, and 26.)—The shells are thrown into a hopper 52, from which they are taken by an endless bucket-chain 53, passing through the same upwardly and moving against one of the sides of said hopper and parallel therewith. The bottom of the hopper has a rectangular opening, which gives passage only to the endless chain and the buckets attached thereto. When the buckets 54 of the chain pass, the shells locate therein, their bottom or their sides resting against the chain. They are then carried along in the direction of the arrow, Fig. 1, and are released as soon as the bucket turns upside down, when the chain descends again. They then drop in the entrance 56 of a passage 57. The bucket-chain 53 is moved by means of the pulley 58, around which it is wound, said pulley receiving a continuous rotating motion from the shaft 10, upon which it is wedged. At the upper part the chain 53 passes over the guiding-pulley 59, the axle of which revolves between the two uprights 60, fixed around the shaft 10 and held against the hopper 52.

The buckets 54, although they are constructed so that they can receive only one shell at a time, might sometimes seize more than one, and if this occurred and more than one shell should fall at a time in the opening 56 of the passage 57 they could obstruct the entrance by their becoming wedged therein. In order to prevent this, the chain itself is agitated. Thereby if the bucket contains only one shell the latter will not fall out, being at the bottom thereof; but if it contains more shells those in excess of one will be thrown out, as they are supported only imperfectly between the walls of said bucket. That agitating is produced by means of a double cam 61, which, moving between the uprights 60 and the two pieces of the bucket-chain 53, will alternately lift and drop the latter. The cam 61 is operated by the pulley 62, upon whose axle it is wedged, while said pulley in its turn is operated by the shaft 10 through the intermediary of the pulley 63 and the band 64.

Returning now to the operation in connection with the shells which have entered the opening 56, as will be seen later, it is necessary that the shells be placed in such a manner in the vertical passage of the transporting-carriage 84 that their concave parts face the inside of the machine—that is, the side where the rotary mandrel 126 is located—so that they can slip upon the same. After having fallen out of the buckets 54 the shells 55 arrive upon the bottom 65 of the passage 57, their concave parts either facing away from the bottom of the passage, Fig. 24, or facing that bottom, Fig. 25. The former are in the right position, while the latter must be thrown out. To that effect I use the following arrangement: The bottom 65 at the entrance of the passage 57 has, as shown in Figs. 24, 25, and 26, an aperture 66, extending between the two vertical sides 69 of that passage, forming a transverse edge 68 and having in its other edge a dovetailed beak 67 and the two openings 70 between that beak and the sides. The distance between the edges 68 and the extremity of the beak 67 is such that the shells when their concavity is facing the exterior of the passage, Fig. 24, cannot tip over because the bottom of the capsule resting on the beak 67 will hold and direct it until its forward edge reaches over the edge 67 of the channel-bottom. These shells, which are in the right position to be slipped upon the mandrel, will therefore continue their course in the passage 57 after having passed over the aperture 66, where we will leave them for the present. The capsules or shells in Fig. 25, on the contrary, have their concavity facing the inside of the passage—that is, the shells are in contact with the bottom 65 only by their vertical walls. When arriving at the end of the beak 67, their front part 75 falls into the empty space 66, and said shells on account of the speed attained during their course through the inclined passage will successively assume all the positions 55', 55", and 55'''. A chamber 71 is placed under the opening 66 for receiving those shells, and a passage 74, forming a prolongation of the chamber, conveys the same again to the hopper 52. During its passage from the position 55' to the position 55" the shell after sliding down completely pivots around the extreme edge of the beak 67, and in order to occupy the position 55''' the fore part 75 strikes while in the position 55" against the wall 72 of the chamber 71. In order that such effect can be produced, it is necessary that the distance between the ridge 68 and the extremity of the beak 67 and the projection of the beak 67 itself be sufficient to allow the passage and the rotation of the shells that were not in the right position.

Returning to the shells which are in the right position for being slipped over the mandrel, which we have left in the middle of the passage 57, these shells pursue their course. The first thereof drops in the socket 80 (shown in Fig. 1) in the edge of a movable plate 76, which throws the same in the passage 83 of the transporting-carriage 84. This occurs only when the passage 83 is below the plate 76, facing the same, which occurs at every termination of the backward course of the carriage. In order to prevent the shell in the socket from dropping before it has arrived over the aperture of the passage 83, one of the lateral sides of the passage 57 has been prolonged in the direction 79. The oscillation of the plate 76 is produced by means of an eccentric 82, fixed upon the shaft 10, said eccentric being connected with the plate 76 by means of its rod 81.

In order that there be not too many shells waiting to be seized by the plate 76, and thus getting jammed in the passage 57, I have arranged what I call a "regulator," composed of the following parts: At 85 the passage 57 is branched, forming a lateral passage 77, the main passage at this point being deflected slightly to one side, forming a shoulder 78. The distance between the point 85 and the plate 76 is such as to receive a certain predetermined number of shells, and when this number of shells is in place (three in the drawings) the upper shell reaches to the lower edge of the lateral branch 77. This upper shell being displaced laterally, as shown in Fig. 1, from the central plane of the main part of the channel 57 will present to any shell falling through said channel an inclined surface, which forms practically a continuation of the inclined lower side of the branch channel, so that when the upper shell of the three is in the position shown any other shell will be deflected laterally into the branch channel. This would not be the case if the upper shell of the three lies with its axis directly in the central plane of the upper or main part of the channel, for then this upper shell would not present an inclined surface to the contacting part of the falling shell. Should there not be three shells in the space between the plate 76 and the branching point 85, any shell falling along the channel 57 will strike the point 85 and be deflected toward the right into the position shown by the upper one of the series of shells. The point 85 forms an offset shoulder in the channel.

*Fourth operation—Shaping and mounting of the shell on the rotary mandrel,* (Figs. 1$^b$, 2$^a$, 3, 7, 8, 9, and 10.)—We take up the shells again where we have left them during the preceding operation. I mean in the passage 83, which is rigidly connected with the carriage 84. They are directed to the point 88 of said carriage successively, and then the transporting-carriage 84 deposits the same upon the mandrel at the rate of one per revolution of shaft 16. The carriage 84 is operated by the cam 89, mounted upon the shaft 16 of the machine. Semicircular clamps 90 and 91 are arranged upon the carriage 84, one of which, 90, is provided with an appendix 92. The shell dropping at the point 88 is arrested in proper position at the front of the carriage, so as to be in line with the mandrel, by the appendix 92, which is rigid with the clamp 90, said appendix obstructing the opening 88, while at the same time the clamps 90 and 91 are withdrawn. The shell is stopped at its lower part by two little stops 94 and 94' and is prevented from falling forward by the said appendix. The shell being then in the free opening 88 the carriage 84 advances toward the mandrel. At the same time the clamps 90 and 91 come nearer the shell and the appendix 92 removes from the same, it being in solidarity with the clamp 90, thus leaving free passage to the shell, which is then pressed between the clamps in order that the latter can give it an exactly circular shape for facilitating its being mounted upon the mandrel. The operation of this appendix is the same as that of a similar part in my Patent No. 513,528 of January 30, 1894. The action of this appendix is illustrated more fully in Figs. 9$^a$ and 9$^b$, the former figure showing the appendix retracted while the capsule is held by the clamps, and the latter figure shows the clamps, retracted and the capsule held by the stops 94 94' and the appendix, which latter prevents the capsule from falling forward. The transporting-carriage still advances while the shell is being shaped and the shell, the rear of which is being held in position by the piston 93, slips upon the mandrel 126, which has a rotary motion, facilitating still more the mounting. At that moment the carriage 84 withdraws to receive another shell from the plate 76, the clamps slacken, the appendix resumes its place for another operation, while the head 95 of the piston 93 presses upon the shell during the period of time that the pasting of the paper $a$ is effected. It is only at the end of that period and after the expulsion of the shell from the mandrel that the piston suddenly jumps backward in order to leave free again the opening 88. The piston while pressing upon the shell during the pasting of the strip has a rotary motion as rapid as that of the mandrel it presses against. Therefore only its head is movable at the extremity of a rod 96, to which it is fixed by means of a pin. The rod 96 is provided with a groove 97, into which a pin 98 passes, which fastens it to the piston 93, while allowing the head to turn. The piston 93 and its movable head 95 are fixed in a tube 99, which is itself in solidarity with a rod 100, which operates the tube and piston back and forth. The various parts whose functions I have just described are operated as follows: The carriage 84 receives its movement of translation from the cam 89 through the intermediary of the piece 101, to the extremity of which a roller 102 is fixed, that engages in the groove of the cam. The piston 93 is actuated by the cam 103 upon the shaft 16 through the intermediary of the piece 104, the roller 105 of which engages in the groove of the said cam 103. The piece 104 is fixed underneath the supporting-carriage 106, wherewith the rod 100 is rigidly connected.

The opening and closing of the clamps are caused as follows: Two columns 107, fixed upon the table 1 of the machine, support the piece 108, which serves as a cross-beam. This beam supports a roller 109, the vertical axle of which extends up through said beam, being held therein by a wing-nut engaging the upper end of the axle. Around the cylindrical part 111 of the carriage 84 a cylindrical piece 112 can turn, upon which a helicoidal path 113 has been laid out, in which the roller 109 engages in such a manner that the movement of translation of the carriage 84 imparts a rotary or oscillating motion to the cylindrical piece 112, Fig. 2$^a$. Ears 114 are fixed upon the cylinder 112, in which cam-slots 115 have been laid out. Rollers 116, the axles of which are rigid with the sliding plates 117, engage in those paths. These plates are connected with the clamps 90 and 91 through the intermediary of the rods 118, which serve as guides for these clamps and sliding plates. The guiding is effected by the passage of the rods in grooves 119, made in the piece 120, connected with the carriage 84 by cross-beams, while leaving a passage for the slides 117, and in grooves 121, made in the piece 122, fixed upon the plate 120 by means of little columns 123, forming cross-beams. The feeding-passage of the shells 83 is itself fixed upon the piece 122. By the rotation of the cylindrical piece 112 the cam-paths will move away from or will bring nearer to the center of the opening 88 the rollers 116, which have engaged therein, and also the pieces that are rigid with those rollers—that is, the plates 117, the rods 118, and the clamps 90 and 91.

In order to hide the clamps, I have placed in front of them a plate 124, wherein a hole is made for the passage of the shells and which is kept at the desired distance from the plate 122 by means of cross-pieces 125.

*Fifth operation—Seizing of the extremity of the paper strip after it has been moistened and feeding of the same to the mandrel for dressing, pasting, and corrugating said strip upon the shell,* (Figs. 1, 2, 3, 7, 12, 13, 14, 15, 16, 20, 21, 31, and 32.(—Let us again take up the shell and the paper strip where we have left them, the former at the fourth operation and the latter during the second operation. The capsule being held upon the mandrel 126 by the piston-head 95 while said mandrel is put in a rotary motion, the pasting of the strip $a$ can be effected. The strip $a$, Figs. 1 and 2, having passed through the passage $h$, arrives at the end of that passage and upon the metallic ruler 127, which forms a stationary table, being therefore independent of the pasting-carriage 128, which is movable. At its arrival on the table 127 the strip $a$ passes under a roller 129. That roller has the double object to guide the same and to make it adhere to the table, while allowing it to slide easily when seized by the pasting-carriage 128. Said roller prevents a backward motion of the strip $a$ and presses constantly upon the same and is situated at the extremity of a lever 130, pivoted in a support 131, the two arms of which are fixed upon the lateral sides of the passage $h$. The strip $a$ after having passed under the roller 129 pursues its course upon the table, which guides same to the spot where it is cut off by the shears 132. A rectangular aperture is made in the table 127, enabling another table 133, Fig. 12, fixed to the carriage 128, to move in a rectilinear direction in order to seize and carry along intermittently the strip $a$ by means of the clamps 134. We have just seen the path along which the strip $a$ moves to reach from the passage to the extremity of the metallic table 127 and will now describe how it will pass over the distance which separates it from the extremity of the table, where the shears are located, to the tangent point of the roller 135 and to the rotary mandrel 126, over which a capsule has just been slipped. Therefore we must take up the strip $a$ at the moment where it has just been cut off by the shears. The clamps 134 rise in order to enable the carriage 128 and the table 133 to move backward without carrying along the strip $a$ in that motion. At the moment the backward motion of the carriage is completed the clamps 134 drop again, seizing the strip $a$ between them and the movable table 133, which is rigid with the pasting-carriage. The strip $a$ having been seized, the carriage 128 advances and the strip is forced between the mandrel 126 and the roller 135, which latter part has been depressed. At that moment the roller 135 rises and presses the moistened extremity of the strip $a$ upon the shell which is located upon the mandrel at the same time as the clamps 134 rise in order to enable sufficient paper to be fed by the rotary motion to dress completely the shell, Fig. 31. During the entire period of the dressing the roller 135 remains lifted and presses the strip against the shell, thus exercising the functions of a pressing-roller. After the shell or capsule is entirely dressed the strip $a$ must be cut off. How this is done will be described in the next operation, (operation 6.) After the cutting the roller 135 and the clamps 134 retract and the carriage moves back in order to allow the various devices to repeat the just-described operation. As soon as the strip $a$ commences to be pasted upon the capsule the corrugating, Fig. 32, must be begun. This is done as follows, Figs. 20 and 21: A circular brush 136, with a vertical axle, to which a continuous rotary motion is imparted, moves away in order to facilitate the slipping of the capsule upon the mandrel 126. It then presses against the angle of that capsule and forces the strip which has already been pasted upon the vertical walls of said capsule 137, Figs. 31 and 32, to finally adhere to the bottom of said capsule. This action lays the strip in a corrugated form upon the bottom of the shell. In order that the brush may not rub upon the tube 99, which surrounds the piston 95, and thereby wear out, an aperture has been provided in said tube, as shown in Figs. 10ª and 10ᵇ.

The various parts of which I have just explained the functions are operated as follows: The continuous rotary motion of the mandrel 126 is produced through the intermediary of the gearing devices 139 and 140, Figs. 2, 3, and 7, the former of which is fixed upon the sleeve 141, upon which the rotary mandrel is fixed, and the second, 140, being fixed upon the shaft 16, which itself receives its rotary motion from the main shaft 20 of the machine through the intermediary of the gearing devices 17, 18, and 19. The various motions of the whole of the carriage and of its constituting parts are produced as follows: The reciprocating motion of the whole of the carriage is produced by the toothed sector 142, which gears with the rack-bar 143, fixed to the lower table 144 of the carriage 128, Figs. 1, 12, 13, 14, and 15. In that movement of translation the carriage is guided by its lower table 144, the two longitudinal tongues 145 of which slide upon the two lateral sides of a slideway 146, fixed upon the table 1 of the machine, and in order to avoid rising movement of the table 144, and consequently of the carriage, at the moment of the translation the supports of four rollers 147 have been fixed upon said table, which rollers bear upwardly upon the overhanging flanges of the retaining-plates 148, which are fixed to the sides of the slideway 146 and project upwardly therefrom. The toothed sector 142 is rigid with the lever 149, linked at the point 150 in a support 151, fixed under the table 1 of the machine. The lever 149 receives its oscillating motion from the connecting-rod 152, with which it is connected. Said connecting-rod 152 is connected with a lever 153, which transmits its motion to the same. The connecting-rod 152 and the lever 153 are connected through the intermediary of a bolt which slides in a slot 154 in said lever. This arrangement has for its object to vary the length of the oscillations of the toothed sector according to requirements. The lever 153 is operated by the shaft 155, upon which it is fixed. (See Fig. 1'.) Said shaft receives its motion from a connecting-rod 156, one of the extremities of which is provided with a roller operated by means of the path 158, made in a cam 157, through the intermediary of the plate 159, loose upon the shaft 155, and of bolt 160, which connects that plate with the plate 161, fixed upon the shaft 155. The connecting-rod 156 is guided by two rollers 162 and 163, the axles of which are fixed upon one arm of the support 151. The bolt 160 is fixed upon the plate 159 and can slide in a circular slot provided in the plate 161, the object of that arrangement being to regulate the position of the carriage at the terminations of its course. A spring 192 constantly attracts the lever 149. The termination of the forward course of the carriage 128 is, moreover, assured by the following arrangement: A small spur 164 is fixed upon the table 144 of the carriage, which is stopped at each forward motion by the extremity of a screw 165, the nut of which is formed by a vertical extension of a shelf 167, fixed upon the two longitudinal paths 148. One of the extremities of the metallic table 127 rests upon the vertical arm 168 of the carriage 128. Its other extremity is fixed upon a support 169, movable in a dovetailed slot, the displacement of said support being caused by a screw 170 turning freely in a vertical arm 171 of the shelf 167 and entering said support. The object of this arrangement is to regulate the direction of the strip $a$ so that it always arrives near the mandrel in proper position to be laid on the box in a perfect circle and prevent all tendency to be laid spirally. The clamps 134 rise in the following manner at the moment the carriage 128 runs backward: They are fixed upon a blade 172, which itself is attached upon the piece 173, which acts as a bridge and is linked in 174 on the outside of the two branches 175 of a support formed by the carriage. Two vertical rods 176 are connected with the arm 173. They are provided with rollers which are supported by two movable guides 177, one of the extremities of which is supported adjustably by screws 178, while the other extremities are lifted by two arms 179, fixed upon the shaft 180, to which an oscillatory motion is imparted by the lever 181, also fixed upon the same. Said lever 181 is provided at one of its extremities with a roller actuated by the cam 182, fixed upon the shaft 16 of the machine. Two springs 183 apply a yielding pressure to the clamps by pressing downwardly upon the plate 173. These springs are held by screws which are threaded through a bracket 184 and have shoulders bearing upon the upper ends of the springs, so that by turning the screws more or less tension is placed upon the springs.

Third. The pasting-roller 135 is lifted as follows: It is mounted between the arms 185 of a support moving around an axle 186, fixed upon the carriage 128. The two arms of that support are connected below the roller by the cross-beam 187, upon which the heads of two screws 188 act. These two screws are rigid with a piece 189, in which a rod 190 is fixed, which is guided in the table 1 of the machine. The lower extremity of that rod 190 is provided with a roller lifted by a cam 191. When the lifting action of the cam 191 stops, the support 185 and the roller 135 drop by their own weight.

Fourth. The clamps 134 are also lifted in order to let the strip pass when the latter is drawn forward by the mandrel for the dressing of the capsules. On one side of the bridge-piece 173 and being of one piece with it is a small arm 193, in which a wormed hole receives a screw 194, the point of which rests on one of the arms of the support 185 in such a manner that when the support 185 is raised the screw 194, the arm 193, and consequently the piece 173 and the clamps 134, that are fixed thereupon, will also be raised during the period of time of the dressing of the capsule.

Fifth. The rotary motion of the vertical brush 136 and its displacement are produced as follows, Figs. 2ª, 7, 20, 20ª, 20ᵇ, 20ᶜ, and 21:

First. Displacement of the brush: A cam 195, fixed upon the shaft 16, displaces the extremity of a lever 196, provided with a roller 197, which imparts to the same an angular motion in a horizontal plane. The lever, which pivots around the stationary vertical shaft 198, transmits its oscillatory motion to the toothed sector 199, fixed upon it. The toothed sector 199 in its turn oscillates the pinion 200, fixed upon the vertical shaft 201, and the latter when turning will displace the arm 202, upon which the support 203 of the brush is fixed. This arm 202 is fixed to the shaft 201, so as to oscillate therewith, the said connection, however, permitting a hand adjustment of the arm 202 with the brush in relation to the shaft. The arm 202 is connected with the shaft 201 in the following manner: A helicoidal wheel 204 is fixed upon the shaft 201. The thread of an endless screw 205, the supports of rotation of which are fixed under the arm 202, engages between the teeth of said wheel 204, the object of the arrangement being to enable the operator to regulate the displacement of the brush 136 above the table 1 of the machine by simply operating the milled button 206, which actuates the screw 205 and makes it revolve around the wheel 204 and the arm 202, upon which it is fixed. A spring 208, fixed upon the support 207, acting upon the block 208, presses constantly the roller 197 against the cam 195.

Second. The continuous rotation of the brush is produced by the toothed wheel 209, fixed upon the sleeve 141, which gears with the wheel 210, fixed upon the shaft 211, revolving in the two arms of a stationary support 212, connected with the support 213 of the vertical shaft 201. There is fixed on the shaft 211 the conical wheel 214, which transmits the rotary motion of the latter to the brush 136 through the intermediary of the wheel 215, which gears therewith, of the wheels 216 and 217, of the shaft 218, and of the wheels 219 220, the latter being fixed upon the vertical shaft 221 of the brush. The wheels 217 and 219 are fixed upon the shaft 218, while the wheels 215 and 216 are fixed to each other and are mounted loose around the shaft 201 in order that the angular displacement of the support 203 of the shaft 218 can take place without preventing the rotation.

*Sixth operation—Cutting off of the part of the strip after having been pasted upon the capsule or shell,* (Figs. 2ª, 7, and 19 to 19ᵉ.)—
We have left the paper strip, fifth operation, at the moment that the capsule had been dressed—that is, at the moment when said paper strip *a* must be cut off. This cutting off is done as follows: When the length of the strip *a* required for dressing the capsule has reached the extremity of the table 127, (which corresponds to the almost complete dressing of the capsule less the distance between the vertical axle of the mandrel and the extremity of the table,) the shears linked upon an independent support 222, which has a motion of translation perpendicular to the direction of the motion of the paper in order to move backward when the strip passes, cut the said strip *a* while accompanying the same in its movement of translation in order to effect a cutting perpendicular to the direction of the dressing.

The various motions of the support and of the shears are produced as follows:

First. The movement of translation of the support 222 is imparted to the same by the cam 223, fixed upon the shaft 16. That cam actuates a roller placed at the extremity of a lever 224, pivoting around an axle 225 and having an arm 226, that actuates a roller 227, carried by a boss 228, situated under the slide of the carriage 222. The roller 227 engages constantly with the lever 226, rolling in a groove made in that lever.

Second. The blades of the shears are operated as follows: The lower blade 230 does not move to effect the cutting. It is fixed upon a socket 232. Only the upper blade 229 moves downward against the lower blade 230. To that effect the blade 229 is fixed upon an axle 231, which passes through the lower blade and the socket 232. Upon this axle is also fixed a lever 233, having an adjustable contact-screw 233ˣ, upon whose extremity the lever 234 presses, which lever is pivoted under the table of the machine at the point 235. The lower extremity of this latter lever 234 is operated by the cam 236, fixed upon the shaft 16. The upper arm of the lever 234 is connected with a spring 237, which assures the contact of its lower part with the cam 236. In order to compel the shears to open again after each cutting operation, an antagonistic spring 238 has been fixed upon a small rod 239 and of a body with a washer 239' in rigid connection with the socket 240 of the support, and it is that spring which presses upon the free part of the lever 233, making the axle 231 revolve, and opens the shears by raising the upper blade 229. A small screw in rigid connection with a small rod 242 and of a body with washer 239', fixed upon the socket 240, limits the action of the spring 238.

Third. The movement of translation of the shears during the cutting of the paper, which movement must keep pace with and be in the same direction as that of the paper, is produced by the following arrangement: The socket 232, upon which the lower stationary blade 230 is fixed, is loose inside the socket 240, formed by the support 222, and this second socket 240 has been provided with a slot in which is located a loose ring 279. A spring 243 around the axle 231 and resting upon the lever 233 on one side and on the other side upon the socket 240, which is in solidarity with the support 222, presses constantly the blade 229 against the blade 230, and thereby the collar 244 of the socket 232 is pressed against the socket 240. The lower part of the ring 279 ends in an appendix 245, assuming the outside cylindrical shape of the socket 240. A path of the shape of a helicoidal arch 246 is made in this appendix, which causes a roller 247, fixed upon the socket 232, to slide in a groove made in the socket 240. An arm 248 is fixed to this same ring 279, which is actuated by the head of the lever 234. It will thus be understood that when that lever 234 displaces the extremity of the arm 248 the ring, and thereby the helicoidal path 246, will turn, displacing transversely in its rectilinear groove the roller 247 and the socket 232, to which it is fixed. This socket will thus push the whole of the two blades in the same direction and at the same rate of speed as the paper, and as it is this same lever 234 that operates the cutting and the advancing of the shears the cutting of the strip *a* will be perpendicular to the direction of the rectilinear displacement of said strip.

*Seventh operation—Feeding of the paper band which has been sized beforehand and out of which a disk must be cut for the outside decoration of the capsules*, (Figs. 1, 2, 2', 3, and 4.)—This strip of paper 250, which is stored upon a drum 251, passes between the two rollers 252 and 253, which feed the same intermittently to the cutting place, which we will describe in the following operation, and when the disk has been cut out the band or strip 250 passes over a guiding-roller 254, which directs said strip outside of the machine as waste.

The feeding of the strip 250 by the rollers 252 and 253 takes place as follows: The lower roller 253, the diameter of which corresponds with the length of the paper for each cutting operation, is acted upon alone, the upper roller 252 being put in motion by adherence. The roller 253 receives its motion from the shaft 255, upon which it is fixed, said shaft itself being driven by the bevel-gear 256, fixed upon it and which receives its rotary motion from the gearing 257, fixed upon the vertical shaft 258. The shaft 258 receives an intermittent rotary motion from the gearing 259, fixed upon the vertical shaft 260, through the intermediary of the gears 261, 262, and 263, the gear 263 being fixed upon the same. (See Figs. 2' and 3$^b$.)

The carrying away or guiding away of the strip 250 after the disk has been cut out takes place by means of the roller 254, over which the strip only passes and by which it is carried along by the adherence produced by its weight. The roller 254 is driven by the roller 253 through the intermediary of grooved pulleys 264 and 265, one of which is fixed upon the shaft 255 and the other upon the axle of the roller 254 and of the belt 266, guided upon the rollers 267. A brake 268 prevents the slipping motion of the drum 251, and a channel 269 guides the paper before its passage between the cylinders 252 and 253.

*Eighth operation—Cutting of the paper disk and feeding thereof into the socket of the turning-down plate placed under the same.*— Coming out of the cylinders 252 and 253 the strip of paper 250 passes over a circular die 270, Figs. 1$^c$, 2$^b$, 3$^c$, 3$^a$, and 3$^e$, fixed under the cylinder 273, in which a hollow cutting-punch 272 operates, consisting of a very thin steel tube and a cutter fitted into the hollow piston 271. This piston 271 is guided in a cylinder 273, fixed under a flap 274, bolted upon the table 1 of the machine. The paper disks after having been cut remain fixed inside the hollow punch 272, and they must be driven out from there. To that effect a solid piston 275 is used, Figs. 1$^c$ and 3$^d$, which is placed inside the piston 271 and is guided thereby. It goes down at the same time as 271, but pursues its course, while the latter has stopped after the cutting has been effected and presses the cut-out disk inside the socket 278 of the turning-down plate 276 and upon the bottom of that socket, which is formed by the hollow piston 277. At that moment the piston 277 reaches half-way the elevation of the cylindrical part of the socket 278.

The various parts the functions of which have been indicated are operated as follows: First. The piston 271 in its different positions is operated in the following manner: A slot 273' has been cut out in one of the sides of the cylinder 273. A gudgeon 280, screwed upon the hollow piston 271, moves in that slot, being guided by the same. That gudgeon is lifted or lowered by an arm 281, fixed to the extremity of the piston 282. This piston moves in a hollow column 283, by which it is guided and which is fixed upon the frame 284 and under the table 1 of the machine. It is driven by the extremity 285 of a lever 286, the other end of which is pivoted to a support 287. The lever 286 has a roller 289 and is operated by the cam 288, which has a groove engaging the roller. The cam 288 is fixed upon the main shaft 20 of the machine.

Second. The said piston 275 is operated as follows: Its upper part has an extension consisting of a cylindrical rod 290, which is actuated by the arm 291, upon which it is screwed. Said arm is fixed upon the extremity of the piston 292. This piston moves in a hollow column 293, Fig. 3$^a$, and is guided thereby. The latter is fixed upon the frame 284 and under the table 1 of the machine and is actuated by one of the extremities 294 of a lever 295, the other end of which is pivoted upon a support 296. Said lever 295 is actuated by a cam 297, fixed upon the main shaft 20, said lever having a roller 298 engaging the cam.

Third. The hollow piston 277 is driven as follows: It moves in a hollow column 299, by which it is guided and which is fixed upon the frame of the machine. The said piston 277 is actuated, Fig. 1°, by the extremity 300 of a lever 301, the other extremity of which is pivoted upon the support 302. The lever 301 is actuated through its roller 304 by the cam 303, which is fixed upon the shaft 20 of the machine.

*Ninth operation—Expelling of the capsule from the mandrel after the paper has been pasted and corrugated upon the same and dropping of the same into the socket of the turning-down plate that already contains the cut-out paper disk,* (Figs. 1, 2, 7, and 32.)—We have left the capsule during operation five at the moment it was almost entirely fitted out with the band *a* and have seen (operations four and five) that at that moment said capsule was kept pressed against the rotary mandrel 126 by means of the piston-head 95. What is required now is to expel said capsule from the mandrel and to convey the same to the turning-down plate 276. To that effect a piston 305, Figs. 7 and 8ª, is placed inside the hollow mandrel 126, which during the time the strip *a* is pasted is held in its place by means of a spiral spring 306, a stop-shoulder 307, Fig. 8ª, serving to limit the position of the piston 305 against the bottom of the mandrel. The spring is supported at one side upon the sleeve 141 and at the other side upon the ring 308, fixed upon the piston 305. For expelling the capsule the piston 305, pushed by the lever 313, advances outside the mandrel, while the piston-head 95 draws back for the same distance. In this manner the two pistons hold the capsule between their extremities and convey the same until it reaches a point over the passage 309. At that moment both suddenly withdraw, (the piston 305 being withdrawn by the spring 306 and the piston 95 continuing its backward course, while the speed thereof increases suddenly,) and the capsule being released drops into the passage 309.

In order to prevent a capsule from sticking to the piston 305, the following arrangement is used: At the extremity and around the piston 305, inside the mandrel, there is a socket 310, which a spring 311, pressing upon the shoulder 307, tends to drive from that piston. A pin 312, passing entirely through piston 305 and socket 310, holds this socket 310 and limits its course outside of the piston by means of the diametrically opposed slots 312, cut in the said socket, in which the pin 312 slides. By this arrangement when the piston-head 95 presses the capsule upon the mandrel the socket 310 slightly touches the extremity of the piston 305. The spring 311 is thereby compressed; but when the pistons 305 and 95 withdraw suddenly the spring 311, expanding, operates the socket and pushes the capsule off the mandrel. The capsule after passing through the passage 309 drops upon the piston 277 in the socket 278 of the turning-down plate 276. The piston 277 at this moment is in position at half the elevation of the cylindrical part of the socket, while the piston 275 has risen until it is over the die 270, so as to enable the capsule to take its place in the socket 278, Fig. 1°. As soon as the capsule has been dropped upon the piston 277, which carries already a cut-out disk, the upper piston 275 comes down lower than the cylindrical part of the socket and then rises again a little to allow the turning down to be effected. (See Figs. 33 and 34.)

The piston 305 is driven forward for the expelling of the capsule by one of the extremities of the lever 313, pivoted at the point 314 in a support fixed upon the table 1, the other extremity of that lever being actuated by the cam 315, fixed upon the shaft 16 of the machine.

*Tenth operation—Turning down and pasting the paper inside the capsule and first partial pasting of the outside disk,* (Figs. 1°, 2ᵇ, 3ª, 22, 23, 33, and 34.)—In the preceding operation we have left the capsule dressed with humid paper that surrounds it and is pasted outside upon the piston 277 and just in the required position for the turning-down devices to act. We must now see how this turning down is effected. Four sectors 316 are displaced in a horizontal plane, passing through the upper edge of the capsule, (see the detail Figs. 22 and 23ᵇ,) and as each moves following a radius of the turning-down plate 276 they form the turning-down devices. These devices, which withdraw to let the capsule fall in the socket 278, are located and operated inside the turning-down plate 276, which is made of two pieces in order to facilitate the construction thereof. The capsule being in its place in the socket 278, Fig. 33, the sectors 316 advance toward the center of that socket and project a few millimeters inside the capsule. They thus turn down the paper horizontally, Fig. 33. At that moment the piston 275, which at its lower extremity is provided with a cylindrical block of rubber 317, which when no pressure is exercised upon the same has exactly the same diameter as the inside of the capsule, comes down and at the moment it is about to reach the sectors 316, which project inside the capsule, said sectors withdraw suddenly, while the rubber block pursues its descending course, meets the paper which has been turned down horizontally, and pastes the same inside the walls, Fig. 34. The block 317 having completely turned down and pasted the paper inside continues its course and presses the bottom of the capsule upon the sized part of the disk 318, and as the lower piston 277 is heated the glue will get soft and the paper disk will be pasted upon the bottom as a consequence of the pressure exercised by the rubber block. During this period of pressure upon the bottom of the capsule the diameter of the said block 317 will increase, and as a consequence thereof it will apply the paper *a* energetically against the vertical walls of the capsule and the gluing will be the better assured. The paper disk 318 and the strip *a* having been pasted, the one inside and the other outside of the capsule, the latter will have to be conveyed to the stamping place, and this will be the subject-matter of the eleventh operation. The turning-down devices composed of the sectors 316 are operated as follows: These four sectors, which move in a circular groove 319 concentric to the socket, are prolonged by means of flat rods 320, which guide the same in their movement of translation each along a radius of the turning-down plate. These rods 320 are connected with rack-bars 321 by means of the pieces 322, forming cross-pieces. Those pieces as well as the rack-bars are guided by and slide in slots 323, provided between the two cylindrical pieces of which the turning-down plate is composed. Four pinions 324, placed in grooves of the turning-down plates and the vertical axles 325 of which are held between the two parts that compose this plate, gear with the rack-bar 321, which they actuate. These pinions are themselves operated by a toothed ring 326, which turns freely in a groove made in the upper part of the plate. That toothed ring has an intermittent rotary motion alternately in one direction and the opposite direction imparted by a connecting-rod 327, with which it is connected by a vertical pin 328, fixed thereupon. A circular path made in the lower part that composes the turning-down plate limits the course of the pin. The connecting-rod 327 is operated by the lever 329, to one of whose extremities it is fixed. Said lever is fixed upon a vertical shaft 330, which is supported in a fixed bearing 331 upon the frame 284, and the upper part of which is guided in a box 332, fixed under the table 1 of the machine. Another lever 333 is fixed upon that shaft 330 which imparts its intermittent rotary motion to the same, which motion it receives from the cam 334, which is wedged upon the main shaft 20 of the machine and in whose path a roller is situated, the vertical rotary axle of which is fixed to the extremity of the said lever 333 at the point 335.

The manner in which the pistons 275 and 277 are operated has been described in the eighth operation. The only thing that remains to be described is how the piston 277 is heated. To that effect I make use of the following device, which I describe here only as an instance, reserving the right to employ any heating device which I may deem convenient. A cylindrical cavity 336 is provided inside the piston 277, and a tube is provided which communicates with the outside by a hole 338 perpendicular to the axis of the piston and at the outside surface thereof. It is through that opening 338, in which a piece 339 is screwed, upon which a flexible tube is fixed, that the steam arrives. The steam will therefore heat the cylindrical surface of the piston, and thus the head of the piston 277 will be heated. The steam abandoning caloric to the metal will condense and the water of condensation will gather at the lower part of the cavity 336, from where it runs outside through the tube 340, pierced in the thickness of the wall of the cavity. Piece 341 is screwed in the tube 340, upon which is fixed a flexible tube that allows the condensation-water to flow outside of the machine. It is on account of the vertical motion of translation of the piston 277 that it has been necessary to use flexible tubes for conveying the steam and letting out the condensation-water, and to let the pieces 339 and 341 pass an opening 342 has been provided in the hollow column 999.

*Eleventh operation—Feeding of the capsule to the stamping-place,* (Figs. $1^c$, $1^\times$, $2^b$, $3^c$, $4^a$, and 11.)—In order to convey the capsule to the stamping-place after the strip *a* has been turned down inside thereof and the disk 318 has been pasted, it must first pass from the socket 278 to the socket 343 of the rotary plate 344, which is located exactly underneath the same at that moment. Therefore the two pistons 275 and 277 come down at the same time while holding between them the capsule, and they place the same in such a manner that it is held in the cylindrical part of the socket 343. At that moment the plate 344, which was at rest in order to receive the capsule, commences to turn to convey the same to the stamping device, which stamping takes place in that plate at the moment that the receiving-socket 343 arrives opposite the stamping organs, the axis of which is placed in the vertical plane passing through the axis of the horizontal shaft 20. In order that the plate can turn, the two pistons 275 and 277 must release the socket 343. This takes place exactly at the moment when the capsule engages with the plate 344. To that effect the piston 275 rises suddenly and reassumes the position it had before the seventh operation—I mean over the die 270. As to the piston 277, it pursues its down course, so as not to be touched by the lower edge of the socket 343. For the conveying of the capsule to the stamping device the plate 344 receives its intermittent rotary motion in the following manner: This plate is fixed around a hollow vertical shaft 345, (the utility of this hollow shaft will be shown in the thirteenth operation,) against the flange 346 of which it is flexibly pressed in order to eventually allow of a slight vertical displacement by means of the threaded ring 347, screwed upon the shaft, said ring pressing upon the washer 348. Besides gudgeons fixed upon the flange 346 and entering recesses in the plate 344 prevent all rotation of that plate with relation to the shaft 345. That shaft receives its rotary motion from the gear 349, wherewith it is united by bolts. That gear itself is driven by the gear 259 on the upper part of a vertical shaft 260, guided in a hollow column 352, fixed to the column 299, and in a socket 355, fixed upon the frame 234. At the lower part of and on the shaft 260 is fixed another helicoidal gear 353, which meshes with and is driven from a similar gear 354, fixed on the horizontal shaft 356. This frame bears in the pedestal 357 on the frame 384 at one end, and at its other end it is suitably journaled in the frame. A gear 359, Fig. $3^a$ or $3^b$, is fixed upon the shaft 356, and this is driven intermittently from the toothed section 360 on the shaft 20. This shaft 20 is rotated continuously through the pulley 361, fixed thereon. It will thus be seen that the shaft 260 will be driven intermittently, and through the described connections between the shaft 260 and the plate 344 said plate will be given a step-by-step movement, so that the sockets will be brought one by one in succession under the turning-down plate and in line with the stamping devices.

The momentary rest or stopping of the plate 344 when the socket is brought in line with the turning-down plate and stamping devices gives time to allow the capsule to pass from the turning-down plate into the socket 343 and at the same time it allows the stamping to be performed. In order to effect this step-by-step movement and to lock the parts against movement between the step-by-step movements, I provide the following arrangement of parts.

The gear 360 on the shaft 20 has only a few teeth at $360^\times$, adapted to engage once in each revolution of the shaft 20 with the teeth on the continuous gear 359 on the shaft 356, to which, therefore, an intermittent movement will be given, the gear 359 moving only a part of a revolution for each complete revolution of the shaft 20 and gear 360. During the intervals between the movements of the gear 359 said gear will be held by a locking-disk 364, secured to the gear 360, engaging depressions 363 in the edge of another locking-plate 362, carried by the gear 359. This locking effect is maintained for almost a complete revolution of the gear 360 until a depression of the teeth $360^\times$ engages the teeth of 359. A depression $364^\times$ is formed in the edge of the locking-disk 364 opposite the teeth $360^\times$ to receive the high parts $363^\times$ of the locking-disk 362 and allow the disk to move.

Second arrangement: In order that in spite of the play of the gearing each socket 343 may take its place exactly opposite the stamping devices and exactly under the socket 278 of the turning-down plate, a locking device is used. To that effect a notch 366 is made between each socket on the plate 344, Fig. $2^b$, one of the edges of which is much rounded at its lower part in order to facilitate the catching of the bolt 367 in said notch. The bolt 367, Fig. 11, consists of a prism provided with a heel-piece 368, which locates in the notches 366 of the plate, and thereby locks the same. That prism, which is guided in a support 369, fixed upon one of the uprights 370, which forms the guides for the supporting-piece of the stamping devices, is operated by the rod 371, that the extremity of which it is connected. Said rod receives a motion of translation from a lever 372, linked upon one of the extremities of a support 373, fixed upon an upright 370, the other extremity being connected with a spiral spring 374, which tends constantly to lift the prism 367, and thus to lock the plate 344 as soon as one of the notches comes opposite the heel-piece 368. For freeing the plate the cam 375 is used, which acts upon the lever 372, in order to press down the piston and the heel-piece and to make it release the notch.

*Twelfth operation—Stamping of the capsule for producing a rim or not and final pasting of outside paper disk,* (Figs. $1^c$, $1^\times$, $2^b$, $3^a$, 3, 11, 27, 28, 29, and 30.)—Each capsule as we have left them in the sockets of the plate 344 faces in its turn the stamping devices, Fig. 27. These stamping devices consist of two pistons. The upper piston 376 is hollow and traversed by a rod 377, which at its lower part is provided with a swelling 382, located in a cavity of said hollow piston. A cylindrical block of rubber 379 is located in that swelling. The lower piston 378 is also hollow and is heated inside. At the moment that the plate 344 stops, being locked by 368, and that one of its sockets faces the pistons 376 and 378 the lower piston 378 rises and takes position under the plate 344, Fig. 28, so that there remains a certain play between its upper surface and the lower surface of said plates at the moment the vertical axis of the socket coincides with that of the two pistons 376 and 378. At the same time the piston 376, which has come down, as well as the rod 377, provided with the cylindrical rubber block 379, locates tightly in the cone of the socket 343, while the rubber block fills completely the capsule and presses its bottom, upon which the paper disk is partially pasted already, against the upper surface 380 of the lower piston 378. (See Fig. 28.) Then while the upper piston 376 and the rod 377 do not move (see Fig. 29) the lower piston 376 will go upward, so as to diminish the play which existed, Fig. 28, between its upper surface 380 and the lower surface of the plate 344. At that moment the rubber block, which is compressed and held in a stationary position by the rod 377, will act upon the material of which the capsule is formed and will increase the diameter thereof at the place where it is not confined by the cylindrical part of the socket 343, thus forming a beginning of a rim. Finally, Fig. 30, the rod 377 rises so that its swelling 382 locates at its place in the upper piston 376, which does not move. This will cause the rubber block to rise also and to release the rim 381. At the same time the lower piston 378 will rise, so that there will be still less play between its upper surface and the lower surface of the plate, Figs. 28 and 29. As a consequence of this motion the bottom of the capsule will rise also and the fold or rim 381, which was partially formed, will be flattened entirely, thus forming the final rim of the capsule. It is well understood that I can give any shape to the rim 381 and that I can avoid making any at all, according to the kind of boxes I desire to make. At the same time as the formation of the rim is effected the disk of paper which is pressed against the bottom of the capsule by the hollow heated piston 378 will be finally pasted upon the bottom of the capsule, as the glue wherewith this disk is provided will soften by the heat and stick to the bottom of the capsule. The stamping being terminated, the two pistons 376 and 378 will withdraw in order to let the plate turn for feeding a new capsule.

The various motions of the devices the functions of which I have just described are obtained as follows:

First. The lower piston 378 is screwed in a sliding piece 383, guided in grooves made in the vertical uprights 370. In its center and below this piece 383 forms a strap 384, between the two arms of which a roller 385 can turn, the horizontal axle of which passes through the arms of said strap. The piece 383, which goes down by its own weight, is lifted by the cam 386, wedged upon the main shaft 20 of the machine. The piston 378 may be adjusted by screwing its shank in or out of the piece 383, and it may be set in any position by the nut 387. The piston is heated by steam, which is introduced into the cavity 388 of the piston stem or shank by a pipe 389. The shank of the piston is connected with a block 391, which has an opening at 390 for the pipe 389 to pass through. The water of condensation will collect in the pocket 392 and will pass off through the pipe 394. A waste-pipe 394 is screwed to pipe 393, by which the condensation-water is carried out of the machine. Piece 391 carries at its upper part a packing 391', into which piston 378 slides and by which all escape of steam is prevented.

Second. The upper piston is screwed in the sliding piece 395, guided between the uprights 370, with the object of easily regulating the position of that piston. A counter-nut 396 assures the stability of that regulation. This piece 395 is connected with the lower piece 397, also guided between the uprights 370 by the two rods 398, which slide freely in the holes made in the piece 383. In its central part and at the top this piece 397 forms two straps 399 and 400, between the arms of which two rollers 401 and 402 can rotate. The piece 397, which goes down by the action of the double cam 403 upon the shaft 20, which acts upon the rollers 401 and 402, is raised by one of the extremities of the lever 404, pivoted at the point 405 in a support fixed under the frame 284, a weight 406 being fixed to the other extremity of that lever, as shown in Fig. 11.

Third. The rod 377, which is inside the piston 376 and passes through the same, is actuated by an arm 407, with which it is connected by means of two rings 468, fixed upon the same, Fig. 4$^a$. That arm is operated by a rod 409, upon the extremity of which it is fixed. Said rod, which slides and is guided in holes made in cylindrical bearings 410 410, cast of one piece with the sliding pieces 383 and 395, is caused to rise by the cam 412, fixed upon the shaft 20, said cam operating a roller 413, fixed upon the extremity of that rod. The pressure upon the rubber block is produced by the spring-rings 414, which bear at one side upon 410 and at the other side upon a shoulder of the rod 409. The constant pressure of the spring-rings 414 is assisted by another pressure the intensity of which can be regulated at will. To this end an arch 418 is fixed upon the sliding piece 395, which arch carries a threaded cap 418', into which a piece 417 is screwed, and this piece has a socket into which a spiral spring 416 is fitted which presses on the rod 377 by means of the bush 415. It will be clear that by screwing the piece 417 in or out a more or less pressure will be produced upon the rod 377, and consequently upon the rubber block 379. When a suitable pressure is reached, the rod 377 is locked by means of the nuts 468 and 468'.

*Thirteenth operation—Dressing of the bottoms of the capsules after they have been shaped,* (Figs. 1$^c$, 1$^x$, 2$^b$, 3$^a$, and 4$^a$.)—As soon as the stamping of the capsule is terminated the capsule is removed on account of the rotation of the plate 344 from the stamping devices, and from that moment the dressing of the bottom commences. It is done as follows: Facing each socket and in that part of the plate between said socket and the hollow shaft 345 radial grooves 419 have been made. Slides 420 move in these grooves, which also guide the same. These slides are fixed under supports 421 and glide upon the plate 344. Plates 422 are fixed under these slides, which slide upon the lower surface of the said plate. Pistons 423, guided by their rods 424 in the supports 421, can move vertically therein. The combination of each support 421 and of each plate 422, connected by the slides 420, form a carriage. Each carriage comes nearer the center of the plate 344, (first period,) and consequently draws farther from the socket opposite which it is movable during the seventh, eighth, ninth, tenth, eleventh, twelfth, and fourteenth operations. I mean during the passage of said socket underneath the socket 278 of the turning-down plate 276, during the conveying to the stamping place, during the stamping process itself, and when the capsule is finally expelled. Each of these carriages, on the contrary, will come nearer the socket, and thus draw farther from the center of the plate (second period) during the thirteenth operation, which is comprised between the stamping process and the final expulsion. During the first period the pistons 423 are raised and during the second period they are down, so as to press upon the plates when passing through the sockets. Thus as soon as the stamping process is ended the carriage corresponding to the socket wherein the capsule which has just been stamped is located advances toward that socket, and the piston 423 presses the bottom of the capsule against the plate 422, which is heated, during the entire time the thirteenth operation lasts. That pressure upon the bottom of the capsule during a certain number of seconds is sufficient for the dressing of the same. The plates 422 are held down at the end of their forward course by notches 437, fixed under the plate 344, with which their extremities engage during the time that the pistons press upon the same. The supports as well as the devices fixed thereto, which revolve with the plate 344, draw nearer to or farther from the center of that plate by means of the fixed cam 425, in the path of which rollers 427 move, which are fixed upon one arm of the supports 421. The raising and lowering of the pistons 423, which press upon the capsules, are produced the former by a path 428 and the latter by a second path 429. These two paths are made upon one and the same stationary cam 430. The first is on the top of said cam, the other under the same. Rollers 431 roll upon those paths, the said rollers being carried by casings 432, which are fixed around rods 424. In order to leave passage for the axles of the rollers 431, guiding-grooves 433 have been provided in the supports 421, and in order to effect a flexible pressure of the pistons upon the bottoms of the capsules a spring made from Belleville washers 424' has been inserted between the casings 432 and shoulders provided upon the rods 424. In order to facilitate the passage of the rollers 431 from the upper path 428 to the lower path 429, and vice versa, the two paths have been prolonged the one over the other at the place where the passage from the upper part of the cam to the lower part, and vice versa, must take place, so that the rollers may be held and guided above and below, Fig. 3ª. The cams 425 and 430 are fixed around a stationary sleeve 434, surrounding the vertical shaft 345 and fixed under a bridle 435, forming part of a cross-piece 436.

We will now see how the plates 422 are heated. To that effect I use the following arrangement, which I describe only as an instance, reserving the right to use whatsoever means I may deem convenient. These plates are heated by conducted heat by the plate 344, which receives heat from the shaft 345, upon which it is fixed. The shaft 345, Fig. 1ᶜ, which is hollow, is heated by a current of steam, which after having communicated its caloric reaches the lower part as condensed water, from where it is extracted to bring it outside. At its lower part that shaft 345 is supported in a pillow 438, the table 439 of which is supported by the frame 284 by means of three columns 440. This arrangement of putting high the pillow 438 has been chosen in order to leave a passage for the shaft 20 and to so locate the cams which are carried thereby as to reduce the size of the machine. The water of condensation flows outside, passing through an opening provided at the lower part of the shaft, which opening comes out in a circular groove 442 cut on the inside of the pillow and which communicates with the outside by means of the opening 443 made in the width of the cylindrical wall of the pillow. A stuffing-box is provided at the upper part of the pillow in order to prevent leaking of steam. The shaft 345 is guided at its upper part in a stuffing-box 444, provided in the cross-beam 436, fixed at one side against the cap 446, which crowns the two uprights 370, and supported at the other side by a column 447, resting upon the body of the pedestal 448 through the intermediary of an arcade 449, which terminates at its lower part. That arcade is fixed upon 448 by means of bolts holding the two pieces 450, which serve as supports for the same. The steam arrives at the upper part of the shaft through a pipe 451, fixed in the bridle 452 of the stuffing-box 444.

*Fourteenth operation—Final expulsion of the capsule when completely shaped*, (Figs. 1, 2, 3, 4, and 11.)—The final expulsion of each capsule takes place at the moment that the socket containing the same stops underneath the piston 453, Figs. 2ᵇ and 4ª. That piston consists of a tube sliding in a support 454, fixed upon the outer surface of the sleeve 434, and is widened at the extremity which acts upon the capsule for expelling the same, so that it only presses upon the edges of the box and not upon the bottom thereof, when it expels the same. This piston receives its motion from a connecting-rod 455, linked upon the solid disk 456, fixed in the tube as near as possible to its lowest extremity. That connecting-rod is connected with the extremity of a lever 457, which puts it in motion. The other extremity of this lever is linked in a support 458, fixed upon the cap 446, and receives its oscillating motion from the spindle which passes through it, said spindle being fixed in a support 459, screwed upon the upper sliding piece 395.

I do not wish to confine myself strictly to the circular box shown, as other shapes might be formed by slightly altering the shape of the parts.

I claim—

1. In a paper-box machine, means for applying the paper strip to the capsule and means for feeding the paper strip, comprising the two cylinders and means for rotating one of said cylinders said means consisting of the rotary disk having a continuous rotary movement, a roller bearing on the face thereof, means for adjusting the roller to and from the center of the rotary plate and means for separating the plate and the roller said means comprising the spring-support for the plate and the hand-lever pressing upon the center of the plate, substantially as described.

2. In combination in a paper-box machine, means for applying the paper strip to the capsule and means for moistening the paper strip which has previously been sized, said means comprising a water-supply and a device for spraying, breaking up or atomizing the water as it is supplied to the strip, with a cock and means for operating the same intermittently to supply the water-spray, substantially as described.

3. In a box-machine, means for acting upon the capsules, and a conduit leading to the said means for carrying the capsules, said conduit having an opening in its bottom with a tongue 67 projecting therein to retain the capsules which rest therein with their bottoms, and to discharge those capsules which are bottom side up, said tongue extending in the plane of the bottom of the chute and having openings on each side thereof between it and the walls of the chute, substantially as described.

4. In a box-machine, means for acting upon the capsules, and a conduit leading to said means having a branch which will relieve the main conduit when it is filled with capsules at its discharge end, the part of main conduit below the branch being offset laterally with respect to the part of the main conduit above the branch, substantially as described.

5. In a box-machine, for acting upon capsules, a conduit for directing the capsules, a movable feed-plate 76, means for operating the same, said conduit having an offset shoulder 85 and a branch 77, the distance between the feed-plate and the offset shoulder being such that the upper side of the capsule will form with the bottom wall of the branch an inclined bearing-surface to deflect the surplus capsules laterally, substantially as described.

6. In combination with the transporting-carriage, the mandrel, the feed-conduit, the oscillating feed-plate at the lower end of the conduit and above the front of the transporting-carriage, said feed-plate having a pocket to receive the capsule and discharge the same at a point between the adjacent faces of the mandrel and transporting-carriage, substantially as described.

7. In combination, in a paper-box machine, a mandrel for receiving the capsules, a transporting-carriage for placing the capsules thereon, said carriage comprising a channel to direct the capsule, the clasps at the bottom of said channel adapted to center the capsules and give them a circular shape, and a piston for placing the capsules on the mandrel, said piston having a revoluble head, means for retracting the carriage while the piston remains in its forward position, said piston partaking in the ejection of the capsule, substantially as described.

8. In combination, in a paper-box machine, a mandrel, a transporting-carriage, a piston in the transporting-carriage, a piston in the mandrel, a discharge-conduit 309 and means for reciprocating and controlling the pistons to carry the capsule from the mandrel to the discharge-conduit and there release the same, both pistons moving to the discharge-point in unison one advancing while the other retracts, substantially as described.

9. In combination, in a paper-box machine, the mandrel for holding the capsule, the means for feeding the dressing-strip to the capsule, and corrugating means comprising a brush, on a vertical rotary shaft, means for moving the brush toward and from the mandrel to engage and be free from the edge of the capsule, the moving means for the brush comprising a shaft and an arm thereon and the worm-and-screw connection between the arm and shaft for adjusting the relation between them, substantially as described.

10. In combination, in a paper-box machine, the mandrel for holding the capsule, the paper-strip-feeding means and the cutting mechanism comprising the shears having one blade pivoted, means for opening and closing the shears and the movable supporting means for the shears adapted to give the same a movement transversely of the strip and a movement corresponding to the direction of movement of the strip substantially as described.

11. In combination, the mandrel, the paper-strip-feeding mechanism, the shears for cutting the paper, the carriage for holding the shears and movable transversely of the paper strip, the sliding support for the shears carried by the carriage, and the rotary cam-ring having connection to the sliding support for moving the same parallel with the direction of movement of the paper strip, and means for operating the rotary ring, substantially as described.

12. In combination the mandrel, the paper-strip-feeding carriage, the clamps carried thereby and adapted to have movement thereon to grip or release the paper strip, the presser-roller movably supported, means for raising the clamps independently of the presser-roller, and means for raising the presser-roller and clamps in unison, substantially as described.

13. In combination, the continuous-feed rollers for the paper, the means for applying the strip to the capsules by an intermittent action, the box $f$ arranged between the feed-rollers and the strip-applying devices, and the intermittingly-acting spray device in said box, substantially as described.

14. In combination, the mandrel, the transporting-carriage, the piston carried thereby, the shaping means carried by the carriage, means for retracting the carriage while the piston is in its forward position, means for retracting the piston, and automatic feeding devices to feed the capsules to the transporting-carriage, said feeding device comprising an oscillating disk with means for moving the same to correspond to the movement of the carriage and thus feed the capsules one by one, substantially as described.

15. In combination, the movable shear-blade, the blade to coact therewith, the shaft 231 carrying the movable blade, the sleeve 232 about the shaft, the bearing supporting said sleeve, the spring for holding the blades, sleeve and shaft in proper position, and means for moving the sleeve in a direction longitudinally of the web to be cut, substantially as described.

16. In combination, the socketed support for receiving the capsule, the hollow cutting-punch, the means for feeding a paper strip thereto to have the disk cut out therefrom, the chute for feeding the capsules to the socketed support, and a plunger working within the said circular cutter to discharge the disk onto the support, substantially as described.

17. In combination, the piston 277 and the socketed plate for receiving the capsule, means for operating the piston, the die 270, the hollow cutting-punch operating in connection therewith, means for feeding the strip of paper to the die and punch to have circular disks cut out therefrom, and a piston 275 with means for operating the same within the hollow cutter or punch to place the disk in the socketed plate and upon the piston 277, substantially as described.

18. In combination, the mandrel with its piston, the transporting-carriage for the shells with its piston, the conduit leading from said parts into which the capsule is dropped by the retraction of the pistons, the socketed turning-down plate located at the end of the conduit for receiving the capsule therefrom, the piston 275 for acting upon the capsule in the said turning-down plate, and means for turning down the dressing-paper, said means being carried by the turning-down plate, substantially as described.

19. In combination, in a paper-box machine, a socketed turning-down plate for receiving the capsule, radially-movable turning-down sectors to engage the projecting edges of the dressing-strip to turn the same across the capsule, a piston for turning the strip and pasting the same within the capsule, and a chute leading to the said socketed turning-down plate, substantially as described.

20. In combination, in a paper-box machine, a socketed plate for receiving the capsules, the turning-down plate having the radially-movable sectors, the piston 275 with means for operating it to turn over the dressing-strip, a piston 277 engaging the bottom of the capsule, means for heating the piston 277 and means for operating the said piston, substantially as described.

21. In combination, the socketed plate, the piston, 277 forming the bottom of the socket, means for cutting out disks and means for locating them to rest on the piston 277, and means for heating the piston 277, substantially as described.

22. In combination, the socketed turning-down plate, means for cutting out paper disks comprising the hollow cutter, the piston operating within the hollow cutter for placing the disks in the bottom of the socket and means for feeding the capsules to the socket after the paper disks have been placed therein, substantially as described.

23. In combination, the socketed turning-down plate, the turning-down means carried thereby for receiving the capsule, the upper and lower pistons 275, 277 movable vertically in line with the socket of the turning-down plate, the stamping device, the rotary carrier, and means for operating the pistons to carry the capsule from the socket of the turning-down plate after the paper has been turned down and pasted and deposit the same in the rotary carrier, substantially as described.

24. In combination, the stationary socketed plate for receiving the capsule, means for feeding the disks thereto, means for feeding the capsules thereto after the disks have been placed, the upper piston, the lower piston, said pistons being arranged to unite the disks and capsules and to dress the same, the rotary carrier arranged to receive the capsule from the said pistons and stamping devices operating in conjunction with the socket in the rotary carrier to form the capsule, substantially as described.

25. In combination, the socketed plate to receive the capsule, means for feeding the paper strip, a cutter for forming disks out of said strip, a piston 275 for forcing the disks into the socket, the piston 277 upon which the disks and capsules rest, means for operating the piston to place the disks and for operating the same to dress the interior of the box, means for operating the piston 277, stamping means, and a rotary carrier arranged to receive the capsule directly from the pistons 275, 277, substantially as described.

26. In combination, the socketed plate to receive the capsule, means for feeding the paper strip from which disks may be cut above the socket, the hollow cutter, the piston 275 within the same, the turning-in means for the outer paper dressing of the capsule, said means being arranged adjacent to the socket, the stamping devices, the carrier for carrying the capsules to the stamping devices, means for operating the piston 275 to place the disks in position and to subsequently dress the interior of the capsule, and a piston 277 with means for operating the same, said pistons 275 and 277, acting to take the capsule from the socket and place the same in the carrier, substantially as described.

27. In combination, with means for holding the capsules, means for stamping the capsules, and dressing means comprising means for pressing the inside and bottom of the capsule after being stamped, said means operating after the capsule has been withdrawn from the stamping means, substantially as described.

28. In combination, the rotary carrier having the sockets, means for placing the capsules therein at one station, means for stamping the capsules at another station, and dressing means supported on the carriage one for each socket, with means for throwing the same into action while the stamping device is out of action, said dressing means comprising devices for pressing the inside and outside of the capsule, substantially as described.

29. In combination, the rotary carrier having the sockets, the means for operating upon the capsules in the sockets, dressing means supported on the carriage and arranged to move radially toward and from the sockets, and means for operating said dressing means to contact with the capsule, substantially as described.

30. In combination the carriage having the sockets, means for acting upon the capsules in forming the same, dressing means including a piston and a lower bearing for the capsule, and means for moving the piston and lower bearing into and out of line axially of the sockets, and means for operating the piston into the socket to dress the capsule in connection with the lower bearing, substantially as described.

31. In combination, the carriage having the sockets, the means for acting upon the capsules in the said sockets in forming the same, the dressing means carried on the carriage, means for causing the same to act on the capsules after they have been formed, and means for heating the dressing means, substantially as described.

In witness whereof I have hereunto set my hand in presence of two witnesses.

GABRIEL PATUREAU.

Witnesses:
C. MALLOR,
CH. DIGEON.